(12) United States Patent
Pan et al.

(10) Patent No.: US 11,166,254 B2
(45) Date of Patent: Nov. 2, 2021

(54) POSITION RELATIONSHIP DETERMINING METHOD AND APPARATUS

(71) Applicant: Huawei Technologies Co., Ltd., Shenzhen (CN)

(72) Inventors: Chun Pan, Nanjing (CN); Weiwei Gu, Shenzhen (CN); Jianlei Cui, Suzhou (CN); Yungui Wang, Nanjing (CN)

(73) Assignee: HUAWEI TECHNOLGOIES CO., LTD., Shenzhen (CN)

( * ) Notice: Subject to any disclaimer, the term of this patent is extended or adjusted under 35 U.S.C. 154(b) by 191 days.

(21) Appl. No.: 16/698,026

(22) Filed: Nov. 27, 2019

(65) Prior Publication Data

US 2020/0178201 A1 Jun. 4, 2020

(30) Foreign Application Priority Data

Nov. 30, 2018 (CN) .......................... 201811456643.1

(51) Int. Cl.
*H04W 64/00* (2009.01)
*H04L 1/00* (2006.01)
*H04W 24/10* (2009.01)
*H04W 84/04* (2009.01)

(52) U.S. Cl.
CPC ......... *H04W 64/006* (2013.01); *H04L 1/0026* (2013.01); *H04W 24/10* (2013.01); *H04W 84/042* (2013.01)

(58) Field of Classification Search
CPC ..... H04W 84/12; H04W 64/00; H04W 88/08; H04W 24/10; H04W 48/20; H04W 24/02; H04W 92/20; H04W 12/63; H04W 48/12; H04W 48/18; H04W 76/10; H04W 76/11; H04W 28/20

See application file for complete search history.

(56) References Cited

U.S. PATENT DOCUMENTS

| | | | |
|---|---|---|---|
| 2014/0112273 A1* | 4/2014 | Aboul-Magd | H04L 69/22 370/329 |
| 2015/0312877 A1 | 10/2015 | Bhanage | |
| 2017/0045627 A1 | 2/2017 | Larsson et al. | |
| 2017/0212210 A1 | 7/2017 | Chen et al. | |
| 2017/0353940 A1 | 12/2017 | Seth et al. | |
| 2017/0356979 A1 | 12/2017 | Georgiou et al. | |

* cited by examiner

*Primary Examiner* — Kwasi Karikari
(74) *Attorney, Agent, or Firm* — Conley Rose, P.C.

(57) ABSTRACT

A position relationship determining method and apparatus includes determining a position relationship between a first wireless local area network (WLAN) device and a second WLAN device based on exceeded-bandwidth wireless channel characteristic data, where the exceeded-bandwidth wireless channel characteristic data is a result obtained after combining wireless channel characteristic data corresponding to all WLAN channels in a channel set, the channel set includes at least two WLAN channels, all the WLAN channels in the channel set belong to a single WLAN frequency band, a total bandwidth occupied by all the WLAN channels in the channel set is greater than 160 megahertz and is greater than a maximum single channel bandwidth supported by the single WLAN frequency band.

20 Claims, 6 Drawing Sheets

POSITION RELATIONSHIP DETERMINING METHOD AND APPARATUS

CROSS-REFERENCE TO RELATED APPLICATION

This application claims priority to Chinese Patent Application No. 201811456643.1, filed on Nov. 30, 2018, which is hereby incorporated by reference in its entirety.

TECHNICAL FIELD

This application relates to the communications field, and in particular, to a position relationship determining method and apparatus.

BACKGROUND

Positioning means positioning a position of a terminal. In a positioning system, a plurality of access points (AP) are deployed in an environment in advance, and a position relationship between the APs is determined. In this way, when a position of a terminal is to be positioned, the position of the terminal may be positioned by using the position relationship between the plurality of APs.

Currently, after the plurality of APs are deployed in advance, a skilled person may measure the position relationship between the plurality of APs in a laser ranging manner. The foregoing manner of determining the position relationship between the plurality of APs is manually implemented, resulting in low position relationship determining efficiency.

SUMMARY

To improve position relationship determining efficiency, this application provides a position relationship determining method and apparatus. The technical solutions are as follows.

According to a first aspect, this application provides a position relationship determining method. The method includes determining a position relationship between a first wireless local area network WLAN device and a second WLAN device based on exceeded-bandwidth wireless channel characteristic data, where the exceeded-bandwidth wireless channel characteristic data is a result obtained after combining wireless channel characteristic data corresponding to all WLAN channels in a channel set, the channel set includes at least two WLAN channels, all the WLAN channels in the channel set belong to a single WLAN frequency band, a total bandwidth occupied by all the WLAN channels in the channel set is greater than 160 megahertz and is greater than a maximum single channel bandwidth supported by the single WLAN frequency band, and wireless channel characteristic data corresponding to each WLAN channel in the channel set is a measurement result for a signal on corresponding WLAN channel between the first WLAN device and the second WLAN device. In this way, the position relationship between the first WLAN device and the second WLAN device can be automatically determined, thereby improving determining efficiency. In addition, because a higher bandwidth leads to a higher time resolution of a time parameter that is of a signal and that is determined based on corresponding wireless channel characteristic data, and a position relationship (such as a distance or an angle) is determined based on the time parameter of the signal, a higher bandwidth leads to a more accurate position relationship. In the method, because the exceeded-bandwidth wireless channel characteristic data is the result obtained after combining the wireless channel characteristic data corresponding to all the WLAN channels in the channel set, and a combined bandwidth of all the WLAN channels in the channel set is greater than a maximum single channel bandwidth supported by a WLAN, accuracy of the position relationship determined based on the exceeded-bandwidth wireless channel characteristic data is higher than that of a position relationship determined based on wireless channel characteristic data of a single channel. Therefore, accuracy of determining a position relationship can be improved in the method.

Optionally, wireless channel characteristic data corresponding to any WLAN channel in the channel set includes first-direction channel state information CSI and second-direction CSI that correspond to the WLAN channel; and the first-direction CSI is obtained through measurement when the second WLAN device receives a first signal on the WLAN channel, the first signal is a signal sent by the first WLAN device on the WLAN channel, the second-direction CSI is obtained through measurement when the first WLAN device receives a second signal on the WLAN channel, and the second signal is a signal sent by the second WLAN device on the WLAN channel. First-direction CSI and second-direction CSI that correspond to each WLAN channel in the channel set may be obtained. In this way, in a subsequent step, first-direction CSI corresponding to all the WLAN channels may be combined into first-direction exceeded-bandwidth CSI, and second-direction CSI corresponding to all the WLAN channels may be combined into second-direction exceeded-bandwidth CSI. The position relationship between the first WLAN device and the second WLAN device may be determined based on the first-direction exceeded-bandwidth CSI and/or the second-direction exceeded-bandwidth CSI.

Optionally, wireless channel characteristic data corresponding to a specified WLAN channel in the channel set further includes a first-direction sending time, a first-direction receiving time, a second-direction sending time, and a second-direction receiving time; and the first-direction sending time is a time at which the first WLAN device sends a third signal on the specified WLAN channel, the first-direction receiving time is a time at which the second WLAN device receives the third signal on the specified WLAN channel, the second-direction sending time is a time at which the second WLAN device sends a fourth signal on the specified WLAN channel, and the second-direction receiving time is a time at which the first WLAN device receives the fourth signal on the specified WLAN channel. In this way, in a subsequent step, a distance between the first WLAN device and the second WLAN device may be determined by using the first-direction sending time, the first-direction receiving time, the second-direction sending time, the second-direction receiving time, the first-direction CSI, and the second-direction CSI. The distance is a position relationship between the first WLAN device and the second WLAN device.

Optionally, the position relationship is a distance between the first WLAN device and the second WLAN device; inverse Fourier transform is performed on first-direction exceeded-bandwidth CSI, to obtain a first energy delay function, where the first energy delay function includes a plurality of energy values and a delay offset corresponding to each energy value, and the first-direction exceeded-bandwidth CSI is a result obtained after combining first-direction CSI corresponding to all the WLAN channels in the channel set; inverse Fourier transform is performed on second-direction exceeded-bandwidth CSI, to obtain a second energy delay function, where the second energy delay function includes a plurality of energy values and a delay offset corresponding to each energy value, and the second-direction exceeded-bandwidth CSI is a result obtained after combining second-direction CSI corresponding to all the WLAN channels in the channel set; the first-direction receiving time corresponding to the specified WLAN channel is adjusted based on an earliest delay offset in a first direction, where the earliest delay offset in the first direction is an earliest delay offset in a delay offset corresponding to an energy value that exceeds an energy threshold and that is included in the first energy delay function; the second-direction receiving time corresponding to the specified WLAN channel is adjusted based on an earliest delay offset in a second direction, where the earliest delay offset in the second direction is an earliest delay offset in a delay offset corresponding to an energy value that exceeds an energy threshold and that is included in the second energy delay function; and the distance between the first WLAN device and the second WLAN device is determined based on an adjusted first-direction receiving time, an adjusted second-direction receiving time, and the first-direction sending time and the second-direction sending time that correspond to the specified WLAN channel.

A higher bandwidth leads to a higher time resolution. In this way, precision of the earliest delay offset that is in the first direction and that is obtained by performing inverse Fourier transform on the first-direction exceeded-bandwidth CSI is higher, and precision of the earliest delay offset that is in the second direction and that is obtained by performing inverse Fourier transform on the second-direction exceeded-bandwidth CSI is higher. In this case, the first-direction receiving time corresponding to the specified WLAN channel is adjusted based on the earliest delay offset in the first direction such that a time at which the second WLAN device receives the first signal transmitted through a direct transmission path can be accurately obtained. The time is the adjusted first-direction receiving time. In addition, the second-direction receiving time corresponding to the specified WLAN channel is adjusted based on the earliest delay offset in the second direction such that a time at which the first WLAN device receives the second signal transmitted through a direct transmission path can be accurately obtained. The time is the adjusted second-direction receiving time. In this way, precision of determining the distance can be improved based on the adjusted first-direction receiving time, the adjusted second-direction receiving time, and the first-direction sending time and the second-direction sending time that correspond to the specified WLAN channel. Therefore, accuracy of determining the distance can be improved.

Optionally, the position relationship is an included angle between a direction of an antenna array of the first WLAN device and a straight line that passes through a linear position of the first WLAN device and a linear position of the second WLAN device; wireless channel characteristic data corresponding to a WLAN channel in the channel set includes wireless channel characteristic data of at least two antennas included in the antenna array of the first WLAN device; and the included angle between the direction of the antenna array of the first WLAN device and the straight line that passes through the linear position of the first WLAN device and the linear position of the second WLAN device is determined based on exceeded-bandwidth wireless channel characteristic data of each of the at least two antennas and a distance between any two of the at least two antennas.

A higher bandwidth leads to a higher time resolution. In this way, precision of determining the included angle between the straight line and the direction of the antenna array of the first WLAN device based on the exceeded-bandwidth wireless channel characteristic data of each of the at least two antennas is higher such that accuracy of determining the included angle is improved.

Optionally, the direction of the antenna array of the first WLAN device is determined based on a direction of the straight line and the included angle. Therefore, the direction of the antenna array of the first WLAN device can be automatically determined.

According to a second aspect, this application provides a position relationship determining method. The method includes determining, based on exceeded-bandwidth wireless channel characteristic data, a distance between a first wireless local area network WLAN device and a second WLAN device, an included angle between a direction of an antenna array of the first WLAN device and a straight line that passes through a linear position of the first WLAN device and a linear position of the second WLAN device, and an included angle between the straight line and a direction of an antenna array of the second WLAN device, where the exceeded-bandwidth wireless channel characteristic data is a result obtained after combining wireless channel characteristic data corresponding to all WLAN channels in a channel set, the channel set includes at least two WLAN channels, all the WLAN channels in the channel set belong to a single WLAN frequency band, a total bandwidth occupied by all the WLAN channels in the channel set is greater than 160 megahertz and is greater than a maximum single channel bandwidth supported by the single WLAN frequency band, and wireless channel characteristic data corresponding to each WLAN channel in the channel set is a measurement result for a signal on corresponding WLAN channel between the first WLAN device and the second WLAN device; determining the linear position of the second WLAN device based on the included angle between the straight line and the direction of the antenna array of the first WLAN device, the distance, the linear position of the first WLAN device, and the direction of the antenna array of the first WLAN device, where the linear position of the first WLAN device and the direction of the antenna array of the first WLAN device are known values; and determining the direction of the antenna array of the second WLAN device based on the included angle between the straight line and the direction of the antenna array of the second WLAN device, the included angle between the straight line and the direction of the antenna array of the first WLAN device, and the direction of the antenna array of the first WLAN device.

In this way, the distance between the first WLAN device and the second WLAN device, and the direction of the antenna array of the second WLAN device can be automatically determined, thereby improving determining efficiency. In addition, a higher bandwidth leads to a higher time resolution. Therefore, in the method, the exceeded-bandwidth wireless channel characteristic data is the result obtained after combining the wireless channel characteristic data corresponding to all the WLAN channels in the channel set, all the WLAN channels in the channel set belong to the single WLAN frequency band, and the total bandwidth occupied by all the WLAN channels in the channel set is greater than 160 megahertz and is greater than the maximum single channel bandwidth supported by the single WLAN frequency band. In this way, accuracy of the distance and the direction of the antenna array of the second WLAN device that are determined based on the exceeded-bandwidth wireless channel characteristic data is relatively high such that accuracy of determining the distance and the direction of the antenna array can be improved.

According to a third aspect, an embodiment of this application provides a position relationship determining apparatus configured to perform the method in the first aspect or any possible implementation of the first aspect. Specifically, the apparatus includes a unit configured to perform the method in the first aspect or any possible implementation of the first aspect.

According to a fourth aspect, an embodiment of this application provides a position relationship determining apparatus configured to perform the method in the second aspect. Specifically, the apparatus includes a unit configured to perform the method in the second aspect.

According to a fifth aspect, an embodiment of this application provides a position relationship determining apparatus, where the apparatus includes a processor and a memory, the processor is connected to the memory, the memory stores one or more programs, the one or more programs are configured to be executed by the processor, and the one or more programs include instructions for performing the method in the first aspect or any possible implementation of the first aspect.

According to a sixth aspect, an embodiment of this application provides a position relationship determining apparatus, where the apparatus includes a processor and a memory, the processor is connected to the memory, the memory stores one or more programs, the one or more programs are configured to be executed by the processor, and the one or more programs include instructions for performing the method in the second aspect.

According to a seventh aspect, an embodiment of this application provides a computer program product, where the computer program product includes a computer program stored in a computer-readable storage medium, and the computing program is loaded by a controller to implement the method in the first aspect, the second aspect, or any possible implementation of the first aspect.

According to an eighth aspect, an embodiment of this application provides a non-volatile computer-readable storage medium configured to store a computer program, where the computer program is loaded by a processor to execute an instruction for the method in the first aspect, the second aspect, or any possible implementation of the first aspect.

According to a ninth aspect, an embodiment of this application provides a chip, where the chip includes a programmable logic circuit and/or a program instruction, and when the chip runs, the chip is configured to implement the method in the first aspect, the second aspect, or any possible implementation of the first aspect.

DESCRIPTION OF EMBODIMENTS

The following further describes in detail the embodiments of this application with reference to accompanying drawings.

In a positioning system, a plurality of wireless local area network (WLAN) devices are deployed in advance, and then a position relationship between the plurality of WLAN devices and a direction of an antenna array of each WLAN device are manually measured, or an antenna array of each WLAN device may be manually disposed such that directions of antenna arrays of all WLAN devices are the same. For example, the antenna arrays of all the WLAN devices may be disposed in one direction. In this way, when a position of a terminal is to be positioned by using the positioning system, the terminal may be positioned by using the position relationship between the plurality of WLAN devices and the direction of the antenna arrays of the WLAN devices.

The position relationship between the plurality of WLAN devices and the direction of the antenna array of each WLAN device are obtained through manual measurement, resulting in low efficiency of obtaining the position relationship between the WLAN devices and low efficiency of obtaining the direction of the antenna array of the WLAN device. In view of this, in this application, the position relationship between the WLAN devices and the direction of the antenna array of the WLAN device can be automatically determined in the following embodiments in order to improve efficiency of determining the position relationship between the WLAN devices and efficiency of determining the direction of the antenna array of the WLAN device.

Figure 1:
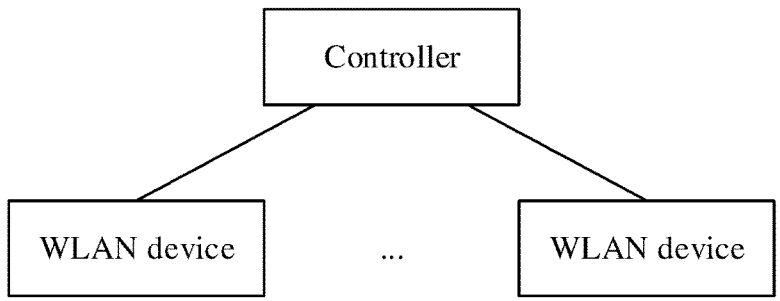
FIG. 1 is a schematic diagram of a network architecture according to an embodiment of this application.

Referring to FIG. 1, an embodiment of this application provides a network architecture. The network architecture may be an architecture belonging to a WLAN communications network, and includes a plurality of WLAN devices and a controller. There is a network connection between the controller and each of the plurality of WLAN devices. Each WLAN device has a device identifier, and the device identifier of the WLAN device is used to uniquely identify the WLAN device in the controller.

The plurality of WLAN devices may traverse WLAN channels in a channel set to obtain exceeded-bandwidth wireless channel characteristic data. The channel set includes at least two WLAN channels. All the WLAN channels in the channel set belong to a single WLAN frequency band. Each WLAN channel in the channel set has a channel identifier, and the channel identifier of the WLAN channel is used to identify the WLAN channel in the controller and each WLAN device. The WLAN channels may be contiguous or discontiguous WLAN channels. The WLAN channels in the channel set may be mutually independent channels, or WLAN channels in the channel set overlap. A total bandwidth occupied by all the WLAN channels in the channel set is greater than 160 megahertz (MHz) and is greater than a maximum single channel bandwidth supported by the single WLAN frequency band. If the WLAN channels in the channel set overlap, an overlapping part is not repeatedly counted in the total bandwidth occupied by all the WLAN channels in the channel set. For example, the channel set includes a WLAN channel 40, a WLAN channel 42, a WLAN channel 60, and a WLAN channel 106 in a 5 gigahertz (GHz)-frequency band, and bandwidths of the four WLAN channels are respectively 20 MHz, 80 MHz, 20 MHz, and 80 MHz. Because the WLAN channel 40 and the WLAN channel 42 overlap, a total bandwidth occupied by the four WLAN channels is 80 MHz+20 MHz+80 MHz=180 MHz.

The channel set may include at least two WLAN channels in a 5 GHz frequency band, and a bandwidth of a WLAN channel in the 5 GHz frequency band may reach 160 MHz. Correspondingly, the total bandwidth occupied by all the WLAN channels in the channel set is greater than 160 MHz. The channel set may include at least two WLAN channels in a 60 GHz frequency band, and a bandwidth of a WLAN channel in the 60 GHz frequency band may reach 2.16 GHz. Correspondingly, the total bandwidth occupied by all the WLAN channels in the channel set is greater than 2.16 GHz. The channel set may include at least two WLAN channels in a 6 GHz frequency band, and a maximum value of a bandwidth of a WLAN channel in the 6 GHz frequency band has not been determined, and is expected to reach 320 MHz. Correspondingly, the total bandwidth occupied by all the WLAN channels in the channel set is greater than 320 MHz.

Optionally, the controller may be an independent device, may be integrated into a positioning server, or may be integrated into a WLAN device in the plurality of WLAN devices. The controller may be alternatively not required in the WLAN, and each WLAN device autonomously manages behavior of the WLAN device.

Any WLAN channel in the channel set may be configured as a working channel of the plurality of WLAN devices, and then wireless channel characteristic data corresponding to the WLAN channel is obtained. The wireless channel characteristic data corresponding to the WLAN channel is a measurement result for a signal on corresponding WLAN channel between a first WLAN device and a second WLAN device. The first WLAN device is any one of the plurality of WLAN devices, and the second WLAN device is another WLAN device that is in the plurality of WLAN devices and that can communicate with the first WLAN device.

Other WLAN channels in the channel set may continue to be successively configured as working channels of the plurality of WLAN devices in the foregoing manner, and wireless channel characteristic data corresponding to each of the other WLAN channels is obtained, so as to obtain wireless channel characteristic data corresponding to all the WLAN channels in the channel set. Wireless channel characteristic data corresponding to all the WLAN channels is combined to obtain the exceeded-bandwidth wireless channel characteristic data, and a position relationship between the first WLAN device and the second WLAN device is determined based on the exceeded-bandwidth wireless channel characteristic data. Optionally, after the position relationship between the first WLAN device and the second WLAN device is determined, a direction of an antenna array of the first WLAN device and/or a direction of an antenna array of the second WLAN device may be further determined.

For a detailed implementation process of obtaining the wireless channel characteristic data corresponding to all the WLAN channels and determining the position relationship between the first WLAN device and the second WLAN device, refer to the following embodiment. Details are not first described herein.

Optionally, a bandwidth of a single WLAN channel in the channel set may be 5 MHz, 10 MHz, 20 MHz, 40 MHz, 80 MHz, 160 MHz, 320 MHz, 640 MHz, 2.16 GHz, or the like.

Optionally, the foregoing network architecture may be a positioning system, the plurality of WLAN devices may be APs, and the obtained position relationship between the first WLAN device and the second WLAN device includes a linear position relationship and/or an angular position relationship. An antenna array of a WLAN device may have directivity. Therefore, the WLAN device may be considered as a point having a direction. A position of the point is a linear position of the point, and a direction of an antenna is an angular position of the point.

Optionally, the positioning system may be an indoor positioning system, and an AP in the indoor positioning system may be deployed on an indoor ceiling.

Figure 2:
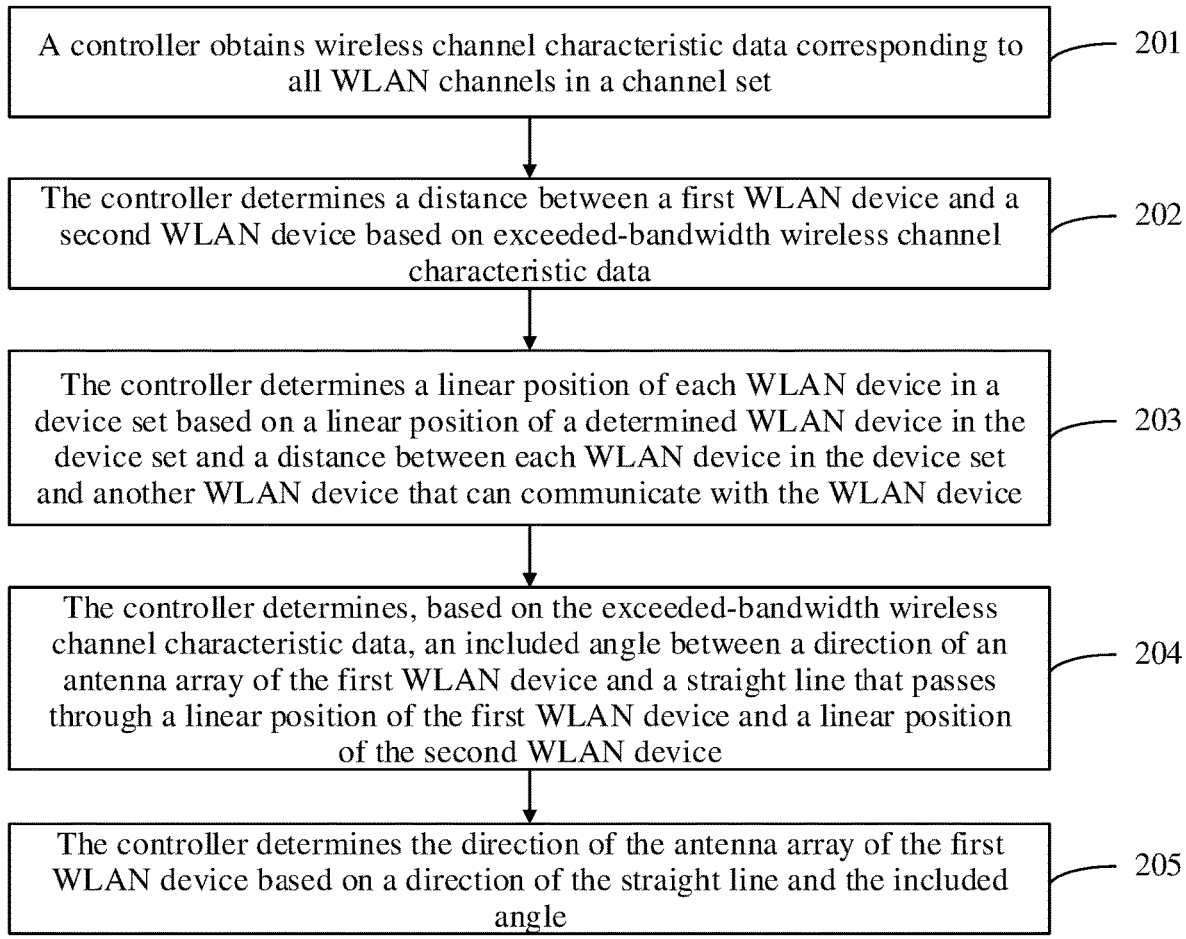
FIG. 2 is a flowchart of a position relationship determining method according to an embodiment of this application.

Referring to FIG. 2, an embodiment of this application provides a position relationship determining method. The method may be applied to the network architecture shown in FIG. 1. The method may be performed by the controller or any WLAN device in the network architecture. Steps of the method are described by using an example in which the method is performed by the controller.

Step 201: The controller obtains wireless channel characteristic data corresponding to all WLAN channels in a channel set, where the channel set includes a plurality of WLAN channels, and wireless channel characteristic data corresponding to each WLAN channel in the channel set is a measurement result for a signal on corresponding WLAN channel between a first WLAN device and a second WLAN device.

Optionally, the first WLAN device is a WLAN device in a device set, the second WLAN device is another WLAN device that is in the device set and that can communicate with the first WLAN device, and the device set includes a plurality of WLAN devices.

All the WLAN channels in the channel set belong to a single WLAN frequency band. A total bandwidth occupied by all the WLAN channels in the channel set is greater than 160 MHz and is greater than a maximum single channel bandwidth supported by the single WLAN frequency band.

The device set may include all or some devices in the network architecture.

Optionally, wireless channel characteristic data corresponding to any WLAN channel in the channel set may include first-direction channel state information (CSI) and second-direction CSI that correspond to the WLAN channel. The first-direction CSI is obtained through measurement when the second WLAN device receives a first signal on the WLAN channel, the first signal is a signal sent by the first WLAN device on the WLAN channel, the second-direction CSI is obtained through measurement when the first WLAN device receives a second signal on the WLAN channel, and the second signal is a signal sent by the second WLAN device on the WLAN channel.

Optionally, the first-direction CSI may include a plurality of complex numbers, and the first-direction CSI may be a vector or a matrix that includes the plurality of complex numbers. The second-direction CSI may include a plurality of complex numbers, and the second-direction CSI may be a vector or a matrix that includes the plurality of complex numbers.

Optionally, wireless channel characteristic data corresponding to a specified WLAN channel in the channel set further includes a first-direction sending time, a first-direction receiving time, a second-direction sending time, and a second-direction receiving time. The first-direction sending time is a time at which the first WLAN device sends a third signal, the first-direction receiving time is a time at which the second WLAN device receives the third signal, the second-direction sending time is a time at which the second WLAN device sends a fourth signal, and the second-direction receiving time is a time at which the first WLAN device receives the fourth signal.

A first signal and the third signal that are sent by the first WLAN device on the specified WLAN channel may be a same signal, or may be different signals. A second signal and the fourth signal that are sent by the second WLAN device on the specified WLAN channel may be a same signal, or may be different signals.

Figure 3:
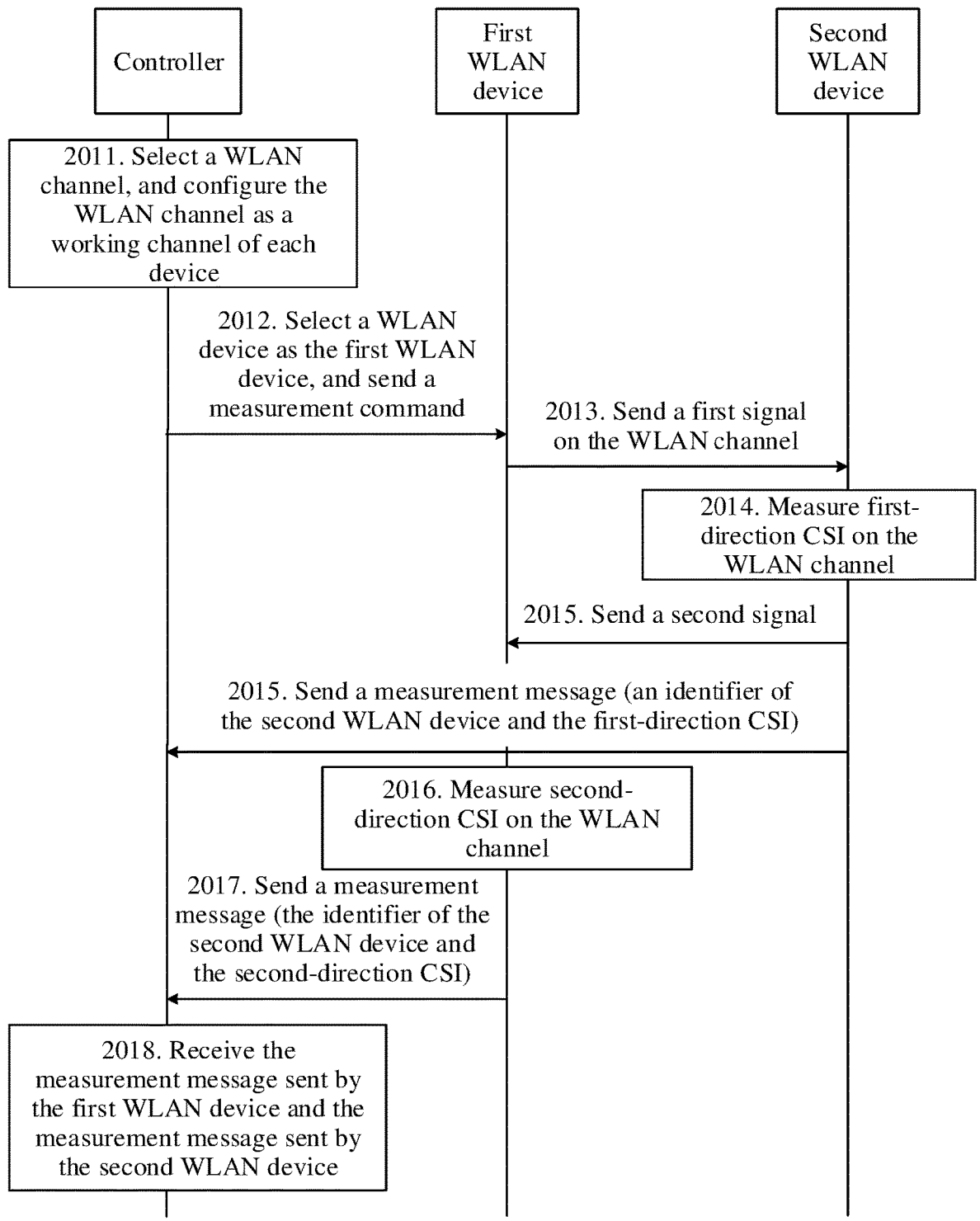
FIG. 3 is a flowchart of a wireless channel characteristic data obtaining method according to an embodiment of this application.

In this step, referring to FIG. 3, the controller may implement the step by using the following operations 2011 to 2018. In the operations 2011 to 2018, the first-direction CSI and the second-direction CSI that correspond to any WLAN channel in the channel set may be obtained, and the first-direction sending time, the first-direction receiving time, the second-direction sending time, and the second-direction receiving time that correspond to the specified WLAN channel in the channel set may be further obtained. The specified channel may be one or more channels in the channel set, or the specified channel may be all the channels in the channel set. Referring to FIG. 3, the operations 2011 to 2018 may be as follows.

2011. The controller selects a WLAN channel from the channel set, and configures the WLAN channel as a working channel of each WLAN device in the device set.

Optionally, the controller may send a configuration command to each WLAN device in the device set, and the configuration command includes an identifier of the WLAN channel.

For any WLAN device in the device set, the WLAN device receives the configuration command, determines the WLAN channel based on the identifier that is of the WLAN channel and that is included in the configuration command, and sets the WLAN channel as a working channel of the WLAN device such that each WLAN device in the WLAN device set works on the WLAN channel.

2012. The controller selects a WLAN device from the device set as the first WLAN device, and sends a measurement command to the first WLAN device.

2013. The first WLAN device receives the measurement command, selects, from WLAN devices that can communicate with the first WLAN device, a WLAN device as the second WLAN device, and sends a first signal to the second WLAN device on the WLAN channel.

The WLAN device that can communicate with the first WLAN device may be a neighbor device of the first WLAN device, the first WLAN device includes a neighbor device list, and the neighbor device list includes an identifier of at least one neighbor device of the first WLAN device.

The first WLAN device receives the measurement command, obtains an identifier of each neighbor device in the neighbor device list included in the first WLAN device, and selects, from devices corresponding to identifiers of all neighbor devices, a WLAN device as the second WLAN device.

Optionally, when the WLAN channel is a specified channel, the first WLAN device may further obtain a first-direction sending time. The first-direction sending time may be a time at which the first WLAN device sends the first signal.

Optionally, each WLAN device in the device set includes a neighbor device list. The neighbor device list in each WLAN device may be obtained in the following manner.

For each WLAN device in the device set, the WLAN device periodically or aperiodically sends a beacon frame. The beacon frame includes an identifier of the WLAN device. For example, the identifier of the WLAN device is an address such as a media access control (MAC) address of the WLAN device. Likewise, the WLAN device also receives a beacon frame sent by a neighbor device around the WLAN device, obtains, as an identifier of the neighbor device of the WLAN device, an identifier that is of a WLAN device and that is in the received beacon frame, and forms a neighbor device list by using the obtained identifier of the neighbor device.

For example, if an identifier of the first WLAN device is an ID 1, and identifiers that are of WLAN devices and that are included in the neighbor device list in the first WLAN device are an ID 2, an ID 3, and an ID 4, the first WLAN device may select, from a WLAN device 2 corresponding to the ID 2, a WLAN device 3 corresponding to the ID 3, and a WLAN device 4 corresponding to the ID 4, the WLAN device 2 as the second WLAN device, and the first WLAN device may send, on a WLAN channel, a first signal to the WLAN device 2 corresponding to the ID 2. If the WLAN channel is the specified WLAN channel, the first WLAN device obtains a first-direction sending time t12. The first-direction sending time t12 is a time at which the first WLAN device sends the first signal.

2014. The second WLAN device receives the first signal on the WLAN channel, and measures first-direction CSI on the WLAN channel.

Optionally, the second WLAN device may measure complex numbers on a plurality of subcarriers included in the WLAN channel, to obtain the first-direction CSI.

An antenna array of the second WLAN device may include one or more antennas. When the antenna array includes one antenna, the first-direction CSI may be a vector, and the vector includes the complex numbers measured by the second WLAN device on the plurality of subcarriers.

When the antenna array includes a plurality of antennas, the first-direction CSI may include CSI of each of the plurality of antennas. The CSI of each antenna may be a vector, the first-direction CSI may be a matrix including the CSI of each antenna, and the CSI of each antenna is one row of the matrix.

Optionally, for each antenna in the second WLAN device, the CSI of the antenna is obtained through measurement when the second WLAN device receives the first signal by using the antenna.

Optionally, when receiving the first signal on the WLAN channel by using the antenna, the second WLAN device measures the complex numbers on the plurality of subcarriers included in the WLAN channel, to obtain the CSI of the antenna. The CSI of the antenna is a vector, and the vector includes the complex numbers measured on the plurality of subcarriers.

Optionally, when the WLAN channel is the specified WLAN channel, the second WLAN device further obtains a first-direction receiving time. The first-direction receiving time is a time at which the second WLAN device receives the first signal.

Regardless of whether the antenna array of the second WLAN device includes one antenna or a plurality of antennas, the second WLAN device obtains only one first-direction receiving time.

For example, for the WLAN device 2, the WLAN device 2 receives the first signal on the WLAN channel, and measures complex numbers on the plurality of subcarriers of the WLAN channel. It is assumed that m complex numbers in total are obtained through measurement and are respectively e21, e22, e23, . . . , and e2m. The m complex numbers form first-direction CSI, and the first-direction CSI is [e21, e22, e23, . . . , e2m]. If the WLAN channel is the specified channel, the WLAN device 2 further obtains a first-direction receiving time t22. The first-direction receiving time t22 is a time at which the WLAN device 2 receives the first signal. m is a preset integer value, and m is greater than 0 and is less than or equal to a quantity of subcarriers included in the WLAN channel.

2015. The second WLAN device sends a second signal to the first WLAN device on the WLAN channel, and sends a measurement message to the controller, where the measurement message includes an identifier of the second WLAN device and the first-direction CSI.

Optionally, the measurement message may further include the identifier of the first WLAN device.

Optionally, when the WLAN channel is the specified channel, the second WLAN device may further obtain a second-direction sending time. The second-direction sending time is a time at which the second WLAN device sends the second signal. In addition, the measurement message sent by the second WLAN device may further include the first-direction receiving time and the second-direction sending time.

For example, the WLAN device 2 sends a second signal to the first WLAN device on the WLAN channel; obtains a second-direction sending time t23, where the second-direction sending time t23 is a time at which the WLAN device 2 sends the second signal; and sends a measurement message to the controller, where the measurement message includes the identifier ID 1, the identifier ID 2, the first-direction receiving time t22, the second-direction sending time t23, and the first-direction CSI (the first-direction CSI is [e21, e22, e23, . . . , e2m]).

2016. The first WLAN device receives the second signal on the WLAN channel, and measures second-direction CSI on the WLAN channel.

Optionally, the first WLAN device may measure complex numbers on the plurality of subcarriers included in the WLAN channel, to obtain the second-direction CSI.

An antenna array of the first WLAN device may include one or more antennas. When the antenna array includes one antenna, the second-direction CSI may be a vector, and the vector includes the complex numbers measured by the first WLAN device on the plurality of subcarriers.

When the antenna array includes a plurality of antennas, the second-direction CSI may include CSI of each of the plurality of antennas. The CSI of each antenna may be a vector, the second-direction CSI may be a matrix including the CSI of each antenna, and the CSI of each antenna is one row of the matrix.

Optionally, for each antenna in the first WLAN device, the CSI of the antenna is obtained through measurement when the first WLAN device receives the second signal by using the antenna.

Optionally, when receiving the second signal on the WLAN channel by using the antenna, the first WLAN device measures the complex numbers on the plurality of subcarriers included in the WLAN channel, to obtain the CSI of the antenna. The CSI of the antenna is a vector, and the vector includes the complex numbers measured on the plurality of subcarriers.

2017. The first WLAN device sends a measurement message to the controller, where the measurement message includes the identifier of the second WLAN device and the second-direction CSI.

Optionally, the measurement message may further include the identifier of the first WLAN device.

Optionally, when the WLAN channel is the specified channel, the first WLAN device may further obtain a second-direction receiving time. The second-direction receiving time is a time at which the first WLAN device receives the second signal. The measurement message sent by the first WLAN device may further include the first-direction sending time and the second-direction receiving time. Regardless of whether the antenna array of the first WLAN device includes one antenna or a plurality of antennas, the first WLAN device obtains only one second-direction receiving time.

For example, the first WLAN device receives, on the WLAN channel, the second signal sent by the WLAN device 2, and measures complex numbers on the plurality of subcarriers included in the WLAN channel. It is assumed that m complex numbers in total are obtained through measurement and are respectively f21, f22, f23, . . . , and f2m. The m complex numbers form second-direction CSI, and the second-direction CSI is [f21, f22, f23, . . . , f2m]. The first WLAN device further obtains a second-direction receiving time t24, and the second-direction receiving time t24 is a time at which the first WLAN device receives the second signal sent by the WLAN device 2. The first WLAN device sends a first measurement message to the controller, and the first measurement message includes the identifier ID 1, the identifier ID 2, the first-direction sending time t12, the second-direction receiving time t24, and the second-direction CSI (the second-direction CSI is [f21, f22, f23, . . . , f2m]).

There may be a plurality of WLAN devices that can communicate with the first WLAN device. The first WLAN device may re-select a WLAN device from the plurality of WLAN devices as the second WLAN device, to perform the operations 2013 to 2017 until all the plurality of WLAN devices are selected.

For example, the first WLAN device may re-select, from the WLAN device 2 corresponding to the ID 2, the WLAN device 3 corresponding to the ID 3, and the WLAN device 4 corresponding to the ID 4, the WLAN device 3 as the second WLAN device, and the first WLAN device may send a first signal to the WLAN device 3 on the WLAN channel. The first WLAN device obtains a first-direction sending time t13, and the first-direction sending time t13 is a time at which the first signal is sent. For the WLAN device 3, the WLAN device 3 receives the first signal on the WLAN channel, and measures complex numbers on the plurality of subcarriers included in the WLAN channel. It is assumed that m complex numbers in total are obtained through measurement and are respectively e31, e32, e33, . . . , and e3m. The m complex numbers form first-direction CSI, and the first-direction CSI is [e31, e32, e33, . . . , e3m]. The WLAN device 3 further obtains a first-direction receiving time t32, and the first-direction receiving time t32 is a time at which the WLAN device 3 receives the first signal. The WLAN device 3 sends a second signal to the first WLAN device on the WLAN channel; obtains a second-direction sending time t33, where the second-direction sending time t33 is a time at which the WLAN device 3 sends the second signal; and sends a measurement message to the controller, where the measurement message includes the identifier ID 1, the identifier ID 3, the first-direction receiving time t32, the second-direction sending time t33, and the first-direction CSI (the first-direction CSI is [e31, e32, e33, . . . , e3m]). The first WLAN device receives, on the WLAN channel, the second signal sent by the WLAN device 3, and measures complex numbers on the plurality of subcarriers included in the WLAN channel. It is assumed that m complex numbers in total are obtained through measurement and are respectively f31, f32, f33, . . . , and f3m. The m complex numbers form second-direction CSI, and the second-direction CSI is [f31, f32, f33, . . . , f3m]. The first WLAN device further obtains a second-direction receiving time t34, and the second-direction receiving time t34 is a time at which the first WLAN device receives the second signal sent by the WLAN device 3. The first WLAN device sends a second measurement message to the controller, and the second measurement message includes the identifier ID 1, the identifier ID 3, the first-direction sending time t13, the second-direction receiving time t34, and the second-direction CSI (the second-direction CSI is [f31, f32, f33, . . . , f3m]).

For example, the first WLAN device may re-select, from the WLAN device 2 corresponding to the ID 2, the WLAN device 3 corresponding to the ID 3, and the WLAN device 4 corresponding to the ID 4, the WLAN device 4 as the second WLAN device, and the first WLAN device may send a first signal to the WLAN device 4 on the WLAN channel. The first WLAN device obtains a first-direction sending time t14, and the first-direction sending time t14 is a time at which the first signal is sent. For the WLAN device 4, the WLAN device 4 receives the first signal on the WLAN channel, and measures complex numbers on the plurality of subcarriers included in the WLAN channel. It is assumed that m complex numbers in total are obtained through measurement and are respectively e41, e42, e43, . . . , and e4m. The m complex numbers form first-direction CSI, and the first-direction CSI is [e41, e42, e43, . . . , e4m]. The WLAN device 4 further obtains a first-direction receiving time t42, and the first-direction receiving time t42 is a time at which the WLAN device 4 receives the first signal. The WLAN device 4 sends a second signal to the first WLAN device on the WLAN channel; obtains a second-direction sending time t43, where the second-direction sending time t43 is a time at which the WLAN device 4 sends the second signal; and sends a measurement message to the controller, where the measurement message includes the identifier ID 1, the identifier ID 4, the first-direction receiving time t42, the second-direction sending time t43, and the first-direction CSI (the first-direction CSI is [e41, e42, e43, . . . , e4m]). The first WLAN device receives, on the WLAN channel, the second signal sent by the WLAN device 4, and measures complex numbers on the plurality of subcarriers included in the WLAN channel. It is assumed that m complex numbers in total are obtained and are respectively f41, f42, f43, . . . , and f4m. The m complex numbers form second-direction CSI, and the second-direction CSI is [f41, f42, f43, . . . , f4m]. The second WLAN device further obtains a second-direction receiving time t44, and the second-direction receiving time t44 is a time at which the first WLAN device receives the second signal sent by the WLAN device 4. The first WLAN device sends a third measurement message to the controller, and the third measurement message includes the identifier ID 1, the identifier ID 4, the first-direction sending time t14, the second-direction receiving time t44, and the second-direction CSI (the second-direction CSI is [f41, f42, f43, . . . , f4m]).

2018. The controller receives the measurement message sent by the first WLAN device and the measurement message sent by the second WLAN device, so as to obtain wireless channel characteristic data corresponding to the WLAN channel.

The controller reads the identifier of the second WLAN device and the second-direction CSI from the measurement message sent by the first WLAN device, and reads the identifier of the second WLAN device and the first-direction CSI from the measurement message sent by the second WLAN device. The first-direction CSI and the second-direction CSI may form the wireless channel characteristic data corresponding to the WLAN channel. The identifier of the first WLAN device is obtained, and the identifier of the first WLAN device, the identifier of the second WLAN device, the identifier of the WLAN channel, and the wireless channel characteristic data may further be correspondingly stored in a correspondence among an identifier of a first WLAN device, an identifier of a second WLAN device, an identifier of a WLAN channel, and wireless channel characteristic data.

Optionally, because the first WLAN device is a WLAN device selected by the controller from the device set, the controller knows which WLAN device in the device set is the first WLAN device, and may directly obtain the identifier of the first WLAN device. Alternatively, the measurement message sent by the first WLAN device and the measurement message sent by the second WLAN device include the identifier of the first WLAN device. Therefore, the identifier of the first WLAN device may be obtained from the measurement message sent by the first WLAN device and/or the measurement message sent by the second WLAN device.

Optionally, it is assumed that the WLAN channel is the specified WLAN channel. The controller may further read the first-direction sending time and the second-direction receiving time from the measurement message sent by the first WLAN device, and read the first-direction receiving time and the second-direction sending time from the measurement message sent by the second WLAN device. The wireless channel characteristic data may further include the first-direction sending time, the first-direction receiving time, the second-direction sending time, and the second-direction receiving time.

For example, the controller receives the first measurement message sent by the first WLAN device and the measurement message sent by the WLAN device 2, reads the identifier ID 2 of the WLAN device 2, the first-direction sending time t12, the second-direction receiving time t24, and the second-direction CSI (the second-direction CSI is [f21, f22, f23, . . . , f2m]) from the first measurement message, reads the identifier ID 2 of the WLAN device 2, the first-direction receiving time t22, the second-direction sending time t23, and the first-direction CSI (the first-direction CSI is [e21, e22, e23, . . . , e2m]) from the measurement message sent by the WLAN device 2, uses t12, t22, t23, t24, [e21, e22, e23, . . . , e2m], and [f21, f22, f23, . . . , f2m] as the wireless channel characteristic data corresponding to the WLAN channel, and if the identifier of the WLAN channel is an IF 1, correspondingly stores the identifier ID 1, the identifier ID 2, the identifier IF 1, and the wireless channel characteristic data in a correspondence among an identifier of a first WLAN device, an identifier of a second WLAN device, an identifier of a WLAN channel, and wireless channel characteristic data that is shown in Table 1.

The controller receives the second measurement message sent by the first WLAN device and the measurement message sent by the WLAN device 3, reads the identifier ID 1 of the first WLAN device, the identifier ID 3 of the WLAN device 3, the first-direction sending time t13, the second-direction receiving time t34, and the second-direction CSI (the second-direction CSI is [f31, f32, f33, . . . , f3m]) from the second measurement message, reads the identifier ID 3 of the WLAN device 3, the first-direction receiving time t32, the second-direction sending time t33, and the first-direction CSI (the first-direction CSI is [e31, e32, e33, . . . , e3m]) from the measurement message sent by the WLAN device 3, uses t13, t32, t33, t34, [e31, e32, e33, . . . , e3m], and [f31, f32, f33, . . . , f3m] as the wireless channel characteristic data corresponding to the WLAN channel, and correspondingly stores the identifier ID 1, the identifier ID 3, an identifier IF 1, and the wireless channel characteristic data in a correspondence among an identifier of a first WLAN device, an identifier of a second WLAN device, an identifier of a WLAN channel, and wireless channel characteristic data that is shown in Table 1.

The controller receives the third measurement message sent by the first WLAN device and the measurement message sent by the WLAN device 4, reads the identifier ID 1 of the first WLAN device, the identifier ID 4 of the WLAN device 4, the first-direction sending time t14, the second-direction receiving time t44, and the second-direction CSI (the second-direction CSI is [f41, f42, f43, . . . , f4m]) from the third measurement message, reads the identifier ID 4 of the WLAN device 4, the first-direction receiving time t42, the second-direction sending time t43, and the first-direction CSI (the first-direction CSI is [e41, e42, e43, . . . , e4m]) from the measurement message sent by the WLAN device 4, uses t14, t42, t43, t44, [e41, e42, e43, . . . , e4m], and [f41, f42, f43, . . . , f4m] as the wireless channel characteristic data corresponding to the WLAN channel, and correspondingly stores the identifier ID 1, the identifier ID 4, an identifier IF 1, and the wireless channel characteristic data in a correspondence among an identifier of a first WLAN device, an identifier of a second WLAN device, an identifier of a WLAN channel, and wireless channel characteristic data that is shown in Table 1.

TABLE 1

| Identifier of a first WLAN device | Identifier of a second WLAN device | Identifier of a WLAN channel | Wireless channel characteristic data |
|---|---|---|---|
| ID 1 | ID 2 | IF 1 | t12, t22, t23, t24, [e21, e22, e23, . . . , e2m], and [f21, f22, f23, . . . , f2m] |
| ID 1 | ID 3 | IF 1 | t13, t32, t33, t34, [e31, e32, e33, . . . , e3m], and [f31, f32, f33, . . . , f3m] |
| ID 1 | ID 4 | IF 1 | t14, t42, t43, t44, [e41, e42, e43, . . . , e4m], and [f41, f42, f43, . . . , f4m] |

After obtaining the wireless channel characteristic data measured by the first WLAN device and each neighbor device of the first WLAN device on the WLAN channel, the controller may re-select a WLAN device from the device set as the first WLAN device, and then repeatedly perform the operations 2012 to 2018. After all WLAN devices in the device set are selected, the controller re-selects a WLAN channel from the channel set, and then repeatedly performs the operations 2011 to 2018, until all the WLAN channels in the channel set are selected.

Optionally, the first WLAN device may alternatively obtain, in a manner other than the foregoing manner, the first-direction sending time and the second-direction receiving time that correspond to the specified WLAN channel, and the second WLAN device may alternatively obtain, in a manner other than the foregoing manner, the first-direction receiving time and the second-direction sending time that correspond to the specified WLAN channel. For example, the following manner is enumerated, and the manner is illustrated below.

The first WLAN device sends the third signal to the second WLAN device on the specified WLAN channel, and obtains, as the first-direction sending time, the time at which the third signal is sent. The second WLAN device receives the third signal on the specified WLAN channel, obtains, as the first-direction receiving time, the time at which the third signal is received, sends the fourth signal to the first WLAN device on the specified WLAN channel, and obtains, as the second-direction sending time, the time at which the fourth signal is sent. The second WLAN device receives the fourth signal on the specified WLAN channel, and obtains, as the second-direction receiving time, the time at which the fourth signal is received.

The controller obtains the wireless channel characteristic data corresponding to all the WLAN channels, and then may determine a position relationship between the first WLAN device and the second WLAN device based on the wireless channel characteristic data corresponding to all the channels.

The position relationship between the first WLAN device and the second WLAN device may be a distance between the first WLAN device and the second WLAN device, and/or may be an included angle between a direction of the antenna array of the first WLAN device and a straight line that passes through a linear position of the first WLAN device and a linear position of the second WLAN device.

When the controller needs to determine the distance between the first WLAN device and the second WLAN device, the controller may perform an operation in the following step 202 to obtain the distance between the first WLAN device and the second WLAN device. After obtaining the distance between the first WLAN device and the second WLAN device, the controller may further proceed to an operation in the following step 203 to determine a linear position of a WLAN device in the device set.

When the controller needs to determine the included angle between the direction of the antenna array of the first WLAN device and the straight line that passes through the linear position of the first WLAN device and the linear position of the second WLAN device, if both the linear position of the first WLAN device and the linear position of the second WLAN device are known, the controller may perform an operation in the following step 204 to obtain the included angle between the direction of the antenna array of the first WLAN device and the straight line that passes through the linear position of the first WLAN device and the linear position of the second WLAN device. After obtaining the included angle between the direction of the antenna array of the first WLAN device and the straight line that passes through the linear position of the first WLAN device and the linear position of the second WLAN device, the controller may further proceed to an operation in the following step 205 to determine the direction of the antenna array of the first WLAN device. Optionally, in this case, the first WLAN device and the second WLAN device may be APs or the like whose positions are known.

If the linear position of the first WLAN device is unknown and/or the linear position of the second WLAN device is unknown, the controller may perform the operation in the following step 202 to obtain the distance between the first WLAN device and the second WLAN device, proceed to the operation in the following step 203 to determine the linear position of the WLAN device in the device set, and then perform the operation in the following step 204 to obtain the included angle between the direction of the antenna array of the first WLAN device and the straight line that passes through the linear position of the first WLAN device and the linear position of the second WLAN device. The controller may further proceed to the operation in the following step 205 to determine the direction of the antenna array of the first WLAN device.

Step 202: The controller determines the distance between the first WLAN device and the second WLAN device based on exceeded-bandwidth wireless channel characteristic data, where the exceeded-bandwidth wireless channel characteristic data is a result obtained after combining the wireless channel characteristic data corresponding to all the WLAN channels.

The controller may obtain, from the correspondence among an identifier of a first WLAN device, an identifier of a second WLAN device, an identifier of a WLAN channel, and wireless channel characteristic data based on the identifier of the first WLAN device and the identifier of the second WLAN device, the wireless channel characteristic data corresponding to all the WLAN channels. For two adjacent WLAN channels in the channel set that do not overlap, wireless channel characteristic data that is obtained through measurement and that is at different frequencies is combined to obtain exceeded-bandwidth wireless channel characteristic data. If some WLAN channels in the channel set overlap each other, weighted processing is performed on a plurality of measurement values corresponding to overlapping frequencies, and then processed wireless channel characteristic data corresponding to the overlapping frequencies and wireless channel characteristic data corresponding to non-overlapping frequencies are combined to obtain exceeded-bandwidth wireless channel characteristic data. The weighted processing may be that a weighted value of one of the measurement values is 1, and weighed values of the other measurement values are 0. In other words, one of the measurement values is directly used to replace the other measurement values. For example, the measurement value that replaces the other measurement values may be wireless channel characteristic data that is first measured, may be wireless channel characteristic data that is last measured, or may be wireless channel characteristic data with highest strength. The weighted processing may be alternatively simple averaging of the plurality of measurement values. The weighted processing may be alternatively weighted averaging of the plurality of measurement values in consideration of various factors (such as a measurement sequence, signal strength, and a direction of arrival).

Optionally, the exceeded-bandwidth wireless channel characteristic data may include first-direction exceeded-bandwidth CSI and second-direction exceeded-bandwidth CSI.

In this step, the distance between the first WLAN device and the second WLAN device may be determined by using the following operations 2021 to 2024. The operations 2021 to 2024 are respectively as follows.

2021. Perform inverse Fourier transform on the first-direction exceeded-bandwidth CSI, to obtain a first energy delay function, where the first energy delay function includes a plurality of energy values and a delay offset corresponding to each energy value, and perform Inverse Fourier transform on the second-direction exceeded-bandwidth CSI, to obtain a second energy delay function, where the second energy delay function includes a plurality of energy values and a delay offset corresponding to each energy value.

First-direction CSI corresponding to all the WLAN channels may be combined to obtain the first-direction exceeded-bandwidth CSI, and second-direction CSI corresponding to all the WLAN channels may be combined to obtain the second-direction exceeded-bandwidth CSI.

Optionally, first-direction CSI of each WLAN channel in the channel set is a vector. The first-direction CSI corresponding to all the WLAN channels may be combined by using the following operations 11 to 14, to obtain the first-direction exceeded-bandwidth CSI. The operations 11 to 14 may be as follows.

11. When a first WLAN channel and a second WLAN channel do not overlap, combine first-direction CSI of the first WLAN channel and first-direction CSI of the second WLAN channel to obtain combined CSI.

Optionally, the first WLAN channel may be a WLAN channel specified in the channel set. The first WLAN channel may be a WLAN channel occupying a minimum frequency, a WLAN channel occupying a maximum frequency, or a WLAN channel occupying another frequency in the channel set.

Optionally, the combined CSI may be obtained by using the following operations 111 to 114. The operations 111 to 114 may be as follows.

111. When a quantity x of complex numbers included in the first-direction CSI of the first WLAN channel is less than a quantity y of complex numbers included in the first-direction CSI of the second WLAN channel, add a preset value before a first complex number and/or after a last complex number, where the first complex number and the last complex number are included in the first-direction CSI of the first WLAN channel, and a quantity of added preset values is y−x, or when a quantity x of complex numbers included in the first-direction CSI of the first WLAN channel is greater than a quantity y of complex numbers included in the first-direction CSI of the second WLAN channel, add a preset value before a first complex number and/or after a last complex number, where the first complex number and the last complex number are included in the first-direction CSI of the second WLAN channel, and a quantity of added preset values is x−y such that the quantity of complex numbers included in the first-direction CSI of the first WLAN channel is equal to the quantity of complex numbers included in the first-direction CSI of the second WLAN channel; and then perform the operation 112. When a quantity x of complex numbers included in the first-direction CSI of the first WLAN channel is equal to a quantity y of complex numbers included in the first-direction CSI of the second WLAN channel, directly perform the operation 112.

112. Compensate a phase of a complex number included in the first-direction CSI of the second WLAN channel, to obtain a CSI set, where the CSI set includes the first-direction CSI of the second WLAN channel and at least one piece of CSI obtained through compensation.

A phase is selected from a preset phase set, and a phase of each complex number included in the first-direction CSI of the second WLAN channel is compensated by using the selected phase, to obtain new CSI. Then, a phase is selected from unselected phases included in the phase set, and the phase of each complex number included in the first-direction CSI of the second WLAN channel is compensated by using the selected phase, to obtain new CSI. The foregoing process is repeated until all phases in the phase set are selected. The CSI set includes all obtained new CSI and the first-direction CSI of the second WLAN channel.

113. Determine a score of each piece of CSI in the CSI set based on the first-direction CSI of the first WLAN channel and the CSI set.

Inverse Fourier transform is performed on Z complex numbers included in the first-direction CSI of the first WLAN channel to obtain Z transformed complex numbers corresponding to the first WLAN channel, and Inverse Fourier transform is performed on Z complex numbers included in target CSI to obtain Z transformed complex numbers corresponding to the second WLAN channel, where the target CSI is any CSI in the CSI set. A difference between a $z^{th}$ transformed complex number corresponding to the first WLAN channel and a $z^{th}$ transformed complex number corresponding to the second WLAN channel is calculated, where z=1, 2, . . . , Z. The difference is squared to obtain a $z^{th}$ squared value. Because z=1, 2, . . . , Z, Z squared values are obtained. The Z squared values are accumulated to obtain a score of the target CSI. The foregoing processing manner for the target CSI is used for each piece of CSI in the CSI set to obtain a score of each piece of CSI.

114. Combine the first-direction CSI of the first WLAN channel and CSI with a lowest score in the CSI set, to obtain the combined CSI.

When a frequency resource occupied by the first WLAN channel and a frequency resource occupied by the second WLAN channel are contiguous, each complex number included in the CSI with the lowest score in the CSI set is added after the last complex number included in the first-direction CSI of the first WLAN channel, to obtain the combined CSI. When a spectrum resource occupied by the first WLAN channel and a frequency resource occupied by the second WLAN channel are discontiguous, a quantity k of subcarriers that space the first WLAN channel and the second WLAN channel is determined. k preset values are added after the last complex number included in the first-direction CSI of the first WLAN channel, and then each complex number included in the CSI with the lowest score in the CSI set is added after the k preset values, to obtain the combined CSI.

Optionally, the preset value may be 0, 1, or the like.

12. When the first WLAN channel and the second WLAN channel overlap, weighted processing is performed on a plurality of complex numbers corresponding to overlapping frequencies, and then processed complex numbers corresponding to the overlapping frequencies and complex numbers corresponding to non-overlapping frequencies are combined, to obtain combined CSI.

An overlapping part between the first WLAN channel and the second WLAN channel is determined. The first-direction CSI corresponding to the first WLAN channel is divided into a first part and a second part other than the first part, where the second part includes complex numbers measured by the second WLAN device on R subcarriers included in the overlapping part, and R is an integer greater than or equal to 1, in other words, the second part includes R complex numbers, and each complex number corresponds to one of the R subcarriers. The first-direction CSI corresponding to the second WLAN channel is divided into a first part and a second part other than the first part, where the first part includes complex numbers measured by the second WLAN device on the R subcarriers, in other words, the first part includes R complex numbers, and each complex number corresponds to one of the R subcarriers.

Phases of two complex numbers corresponding to each of the R subcarriers are respectively obtained from the second part included in the first-direction CSI corresponding to the first WLAN channel and the first part included in the first-direction CSI corresponding to the second WLAN channel. A phase difference between the two complex numbers corresponding to each subcarrier is calculated, and linear fitting is performed on the phase difference to obtain a linear function, where an independent variable of the linear function is a frequency of a subcarrier, and a dependent variable of the linear function is a fitted phase. A phase value that needs to be compensated for each subcarrier of the second WLAN channel is determined by using the linear function based on a frequency of each subcarrier included in the second WLAN channel. A phase of a complex number that is of each subcarrier and that is included in the first-direction CSI of the second WLAN channel is compensated based on the phase value that needs to be compensated for each subcarrier of the second WLAN channel, to obtain a compensation complex number of each subcarrier included in the second WLAN channel.

For the R subcarriers included in the overlapping part, a weighted value of an $r^{th}$ subcarrier is calculated based on a complex number corresponding to the $r^{th}$ subcarrier in the second part of the first WLAN channel, a first weight, a compensation complex number corresponding to the $r^{th}$ subcarrier in the second WLAN channel, and a second weight, where r=1, 2, . . . , R. In this way, weighted values of the R subcarriers are obtained. A weighted value of each of the R subcarriers is added after the first part included in the first-direction CSI corresponding to the first WLAN channel, and then a compensation complex number of each subcarrier in an $(R+1)^{th}$ subcarrier to a last subcarrier included in the second WLAN channel is added, to obtain a combined vector.

13. When an $n^{th}$ WLAN channel and an $(n-1)^{th}$ WLAN channel do not overlap, combine the combined CSI and first-direction CSI of the $n^{th}$ WLAN channel, where n=2, 3, . . . , N, and N is a quantity of WLAN channels included in the channel set.

Optionally, the first-direction CSI of the $n^{th}$ WLAN channel may be processed by using operations the same as the operations 111 to 113, to obtain CSI with a lowest score. Details are not described herein again.

When a frequency resource occupied by the $(n-1)^{th}$ WLAN channel and a frequency resource occupied by the $n^{th}$ WLAN channel are contiguous, each complex number included in the CSI with the lowest score is added after a last complex number included in the combined CSI, to obtain a combined vector. When a spectrum resource occupied by the $(n-1)^{th}$ WLAN channel and a frequency resource occupied by the $n^{th}$ WLAN channel are discontiguous, a quantity p of subcarriers that space the $(n-1)^{th}$ WLAN channel and an $(n-2)^{th}$ WLAN channel is determined, p preset values are added after a last complex number included in the combined CSI, and then a complex number included in the CSI with the lowest score is added after the p preset values.

14. When an $(n-1)^{th}$ WLAN channel and an $n^{th}$ WLAN channel overlap, perform weighted processing on a plurality of complex numbers corresponding to overlapping frequencies, update the complex numbers that correspond to the overlapping frequencies and that are included in the combined CSI to processed complex numbers corresponding to the overlapping frequencies, and then combine updated combined CSI and complex numbers corresponding to non-overlapping frequencies in the $n^{th}$ WLAN channel.

An overlapping part between the $(n-1)^{th}$ WLAN channel and the $n^{th}$ WLAN channel is determined, and the overlapping part includes Q subcarriers. Phases of two complex numbers corresponding to each of the Q subcarriers are obtained from the combined CSI and first-direction CSI of the $n^{th}$ WLAN channel. A phase difference between the two complex numbers corresponding to each subcarrier is calculated, and linear fitting is performed on the phase difference to obtain a linear function, where an independent variable of the linear function is a frequency of a subcarrier, and a dependent variable of the linear function is a fitted phase. A fitted phase of each subcarrier of the $n^{th}$ WLAN channel is determined by using the linear function based on a frequency of each subcarrier included in the $n^{th}$ WLAN channel. A phase of a complex number that is of each subcarrier and that is included in the first-direction CSI of the $n^{th}$ WLAN channel is compensated based on the fitted phase of each subcarrier of the $n^{th}$ WLAN channel, to obtain a compensation complex number of each subcarrier included in the $n^{th}$ WLAN channel.

For the Q subcarriers included in the overlapping part, a weighted value of a $q^{th}$ subcarrier is calculated based on a complex number corresponding to the $q^{th}$ subcarrier in the combined CSI, a first weight, a compensation complex number corresponding to the $q^{th}$ subcarrier in the $n^{th}$ WLAN channel, and a second weight, where q=1, 2, ..., Q. In this way, weighted values of the Q subcarriers are obtained. A complex number that is of each of the Q subcarriers and that is included in the combined CSI is updated to a weighted value of each subcarrier, and then a compensation complex number of each subcarrier in a $(Q+1)^{th}$ subcarrier to a last subcarrier included in the $n^{th}$ WLAN channel is added.

The operations 13 and 14 are repeatedly performed. After the operations 13 and 14 are performed on each WLAN channel in the channel set, obtained combined CSI is the first-direction exceeded-bandwidth CSI.

Optionally, for an implementation process of combining the second-direction CSI corresponding to all the WLAN channels to obtain the second-direction exceeded-bandwidth CSI, refer to the foregoing implementation process of obtaining the first-direction exceeded-bandwidth CSI. Details are not described herein again.

Optionally, a quantity of energy values included in the first energy delay function may be equal to a quantity of energy values included in the second energy delay function. A quantity of elements included in the first-direction exceeded-bandwidth CSI may be equal to a quantity of elements included in the second-direction exceeded-bandwidth CSI.

Optionally, the first energy delay function may include L energy values, where L is a preset integer value, and L is greater than or equal to the quantity of elements included in the first-direction exceeded-bandwidth CSI.

$L=2^z$, and z is an integer greater than or equal to 0. For example, when the quantity of elements included in the first-direction exceeded-bandwidth CSI is equal to 2000, L may be a value such as 2048 or 4096.

In this step, inverse Fourier transform is performed on the first-direction exceeded-bandwidth CSI to obtain L transformed complex numbers and a delay offset corresponding to each transformed complex number. An energy value corresponding to each transformed complex number is obtained based on the transformed complex number, and the delay offset corresponding to the transformed complex number is determined as a delay offset of the energy value corresponding to the transformed complex number. The foregoing operations are performed on each transformed complex number, so as to obtain L energy values and a delay offset corresponding to each energy value, in other words, obtain the first energy delay function.

Inverse Fourier transform is performed on the second-direction exceeded-bandwidth CSI to obtain L transformed complex numbers and a delay offset corresponding to each transformed complex number. An energy value corresponding to each transformed complex number is obtained based on the transformed complex number, and the delay offset corresponding to the transformed complex number is determined as a delay offset of the energy value corresponding to the transformed complex number. The foregoing operations are performed on each transformed complex number, so as to obtain L energy values and a delay offset corresponding to each energy value, in other words, obtain the second energy delay function.

Optionally, each transformed complex number obtained after performing inverse Fourier transform on the first-direction exceeded-bandwidth CSI is used to indicate a gain of the WLAN channel. A delay offset corresponding to a maximum energy value included in the first energy delay function is a moment 0, and a delay offset corresponding to each of other energy values included in the first energy delay function is a time offset relative to the moment 0.

Optionally, each transformed complex number obtained after performing inverse Fourier transform on the second-direction exceeded-bandwidth CSI is used to indicate a gain of the WLAN channel. A delay offset corresponding to a maximum energy value included in the second energy delay function is a moment 0, and a delay offset corresponding to each of other energy values included in the second energy delay function is a time offset relative to the moment 0.

Optionally, for each transformed complex number, an absolute value of the transformed complex number is calculated, and then a squared value of the absolute value is calculated. The squared value is an energy value corresponding to the transformed complex number.

2022. Select an earliest delay offset in a first direction from a delay offset corresponding to an energy value that exceeds an energy threshold and that is included in the first energy delay function, and select an earliest delay offset in a second direction from a delay offset corresponding to an energy value that exceeds an energy threshold and that is included in the second energy delay function.

Optionally, the energy threshold may be a preset threshold. Alternatively, the energy threshold may be obtained through calculation based on the energy values included in the first energy delay function or the energy values included in the second energy delay function. During implementation, the energy values included in the first energy delay function may be added to obtain a total energy value, and a product of a preset percentage and the total energy value is calculated to obtain the energy threshold. Alternatively, the energy values included in the second energy delay function may be added to obtain a total energy value, and a product of a preset percentage and the total energy value is calculated to obtain the energy threshold.

2023. Adjust, based on the earliest delay offset in the first direction, the first-direction receiving time corresponding to the specified WLAN channel, and adjust, based on the earliest delay offset in the second direction, the second-direction receiving time corresponding to the specified WLAN channel.

The specified WLAN channel herein may be the first WLAN channel in the operation 11.

2024. Determine the distance between the first WLAN device and the second WLAN device based on an adjusted first-direction receiving time, an adjusted second-direction receiving time, and the first-direction sending time and the second-direction sending time that correspond to the specified WLAN channel.

Optionally, the distance between the first WLAN device and the second WLAN device may be determined by using the following first formula.

The first formula is $$L = \frac{(T_6 - T_1) - (T_3 - T_5)}{2} * V.$$

In the first formula, L is the distance between the first WLAN device and the second WLAN device, $T_1$ is the first-direction sending time, $T_3$ is the second-direction sending time, $T_5$ is the adjusted first-direction receiving time, $T_6$ is the adjusted second-direction receiving time, V is a preset signal transmission speed, and * is a multiplication operation.

The controller may repeatedly perform the operations 2021 to 2024, to obtain a distance between each WLAN device in the device set and another WLAN device that communicates with the WLAN device.

Optionally, the device set includes at least one to-be-determined WLAN device whose linear position is unknown and at least one determined WLAN device whose linear position is known. The linear position of the determined WLAN device may be obtained through manual measurement or in another manner.

After the distance between each WLAN device in the device set and the other WLAN device that communicates with the WLAN device is obtained, the linear position of the to-be-determined WLAN device may be determined by using the following step:

Step 203: The controller determines a linear position of each WLAN device in the device set based on the linear position of the determined WLAN device in the device set and the distance between each WLAN device in the device set and the other WLAN device that can communicate with the WLAN device.

In this step, the controller determines relative positions between all the WLAN devices in the device set based on the distance between each WLAN device in the device set and the other WLAN device that can communicate with the WLAN device. The controller obtains a linear position of each to-be-determined WLAN device based on the relative positions of all the WLAN devices in the device set and the linear position of the determined WLAN device.

Step 204: The controller determines, based on the exceeded-bandwidth wireless channel characteristic data, the included angle between the direction of the antenna array of the first WLAN device and the straight line that passes through the linear position of the first WLAN device and the linear position of the second WLAN device.

The antenna array of the first WLAN device includes at least two antennas, and wireless channel characteristic data corresponding to a WLAN channel in the channel set includes wireless channel characteristic data of the at least two antennas included in the antenna array of the first WLAN device. The exceeded-bandwidth wireless channel characteristic data includes exceeded-bandwidth wireless channel characteristic data of each of the at least two antennas, and the exceeded-bandwidth wireless channel characteristic data of the antenna is obtained after combining wireless channel characteristic data that is of the antenna and that corresponds to all the WLAN channels.

In this step, the included angle between the direction of the antenna array of the first WLAN device and the straight line that passes through the linear position of the first WLAN device and the linear position of the second WLAN device may be determined based on the exceeded-bandwidth wireless channel characteristic data of each of the at least two antennas and a distance between any two of the at least two antennas.

Wireless channel characteristic data that is of an antenna and that corresponds to a WLAN channel includes CSI of the antenna. The second-direction CSI that corresponds to the WLAN channel and that is measured by the first WLAN device includes CSI of each of the at least two antennas. The channel set includes a plurality of WLAN channels. Therefore, CSI that is of the antenna and that corresponds to all the WLAN channels is combined to obtain exceeded-bandwidth CSI of the antenna, in other words, obtain exceeded-bandwidth wireless channel characteristic data of the antenna.

Optionally, for an implementation process of combining the CSI that is of the antenna and that corresponds to all the WLAN channels to obtain the exceeded-bandwidth CSI of the antenna, refer to the foregoing implementation process of obtaining the first-direction exceeded-bandwidth CSI. Details are not described herein again.

Figure 4:
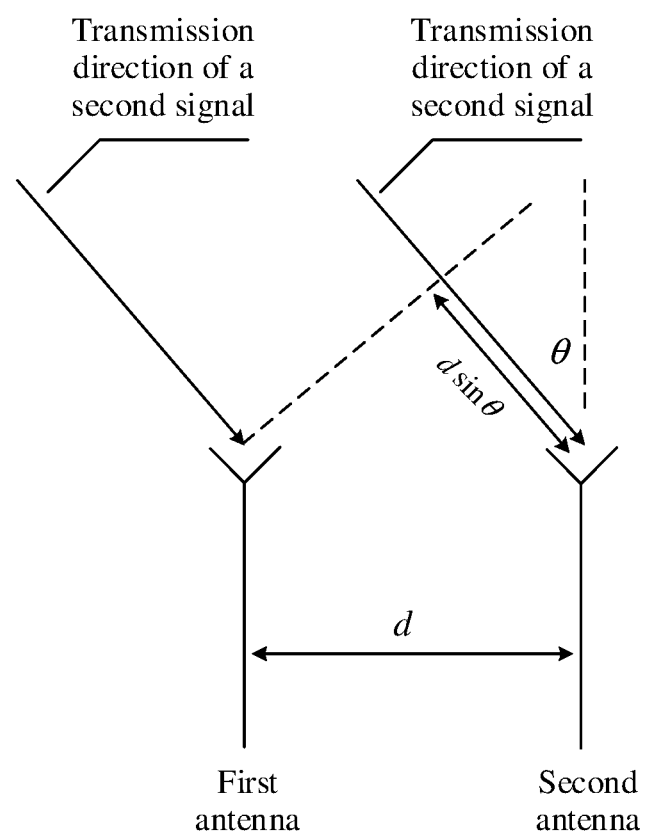
FIG. 4 is a schematic structural diagram of an antenna array according to an embodiment of this application.

Referring to FIG. 4, for any two antennas, referred to as a first antenna and a second antenna for ease of description, in the at least two antennas, a transmission direction of a second signal sent by the second WLAN device and received by the first antenna is the same as a transmission direction of a second signal sent by the second WLAN device and received by the second antenna, but a phase at which the first antenna receives the second signal is different from a phase at which the second antenna receives the second signal.

Referring to FIG. 4, a distance d between the first antenna and the second antenna, an included angle θ between the transmission direction of the second signal and the first antenna (or the second antenna), and a phase difference ΔP between the phase at which the first antenna receives the second signal and the phase at which the second antenna receives the second signal meet a relationship shown in the following second formula.

The second formula is $$\frac{d\sin\theta}{\lambda} = \frac{\Delta P}{2\pi},$$

where λ is a center frequency of an actual bandwidth occupied by all the channels in the channel set.

In this step, CSI that is of the first antenna and that corresponds to all the WLAN channels is combined to obtain exceeded-bandwidth CSI of the first antenna, Inverse Fourier transform is performed on the exceeded-bandwidth CSI of the first antenna to obtain L transformed complex numbers and a delay offset corresponding to each transformed complex number, an earliest delay offset is selected from a transformed complex number that exceeds a preset threshold, a transformed complex number corresponding to the earliest delay offset is obtained, and a phase corresponding to the obtained transformed complex number is used as the phase at which the first antenna receives the second signal.

CSI that is of the second antenna and that corresponds to all the WLAN channels is combined to obtain exceeded-bandwidth CSI of the second antenna, Inverse Fourier transform is performed on the exceeded-bandwidth CSI of the second antenna to obtain L transformed complex numbers and a delay offset corresponding to each transformed complex number, an earliest delay offset is selected from a transformed complex number that exceeds a preset threshold, a transformed complex number corresponding to the earliest delay offset is obtained, and a phase corresponding to the obtained transformed complex number is used as the phase at which the second antenna receives the second signal.

The phase difference is calculated based on the phase at which the first antenna receives the second signal and the phase at which the second antenna receives the second signal. The included angle θ between the transmission direction of the second signal and the first antenna (or the second antenna) is calculated by using the foregoing second formula based on the distance d between the first antenna and the second antenna and the phase difference ΔP. The included angle θ is the included angle between the direction of the antenna array of the first WLAN device and the straight line that passes through the linear position of the first WLAN device and the linear position of the second WLAN device.

For any one of the L transformed complex numbers, the complex number corresponds to an amplitude and a phase, and the complex number may be represented by using the amplitude and the phase.

Step 205: The controller determines the direction of the antenna array of the first WLAN device based on a direction of the straight line and the included angle.

Figure 5:
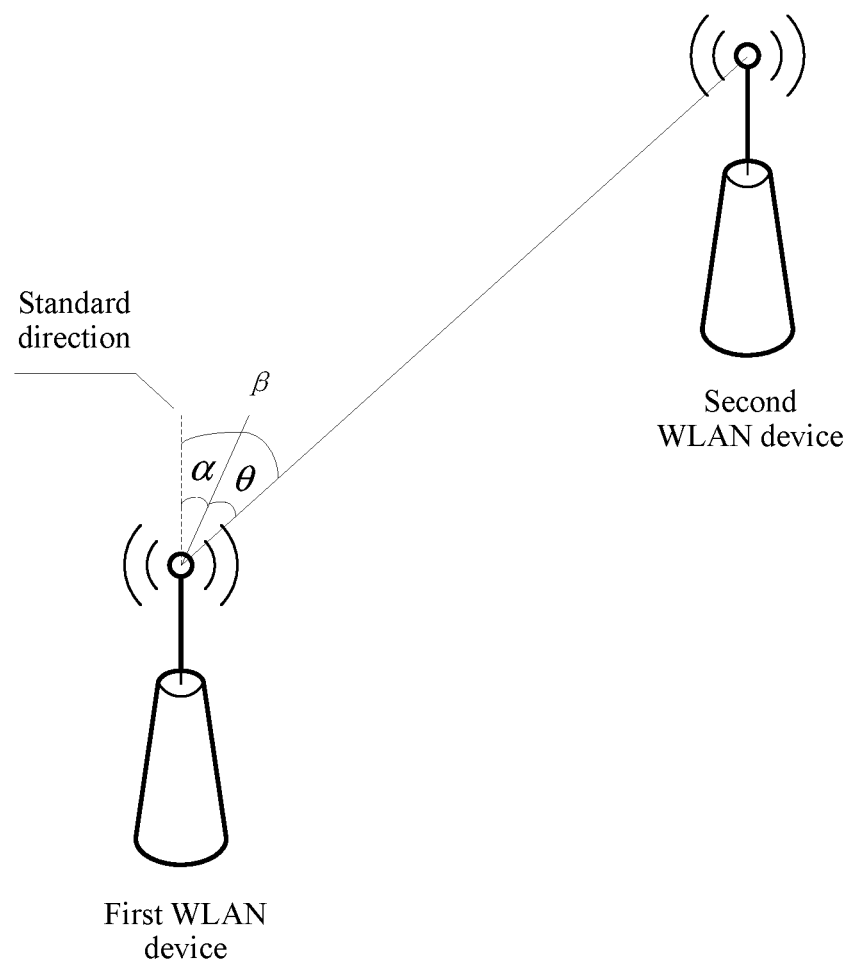
FIG. 5 is a schematic diagram of a position relationship between a first WLAN device and a second device according to an embodiment of this application.

Referring to FIG. 5, the controller determines a direction as a standard direction. Optionally, the standard direction may be a direction such as due north, due east, due south, or due west. An included angle between the direction of the antenna array of the first WLAN device and the standard direction is α.

The direction of the antenna array of the first WLAN device is α, α is the included angle between the direction of the first antenna array and the standard direction, the included angle between the direction of the antenna array of the first WLAN device and the straight line that passes through the linear position of the first WLAN device and the linear position of the second WLAN device is θ, the direction of the straight line that passes through the linear position of the first WLAN device and the linear position of the second WLAN device is β, β is an included angle between the straight line and the standard direction, and α, θ, and β meet a relationship shown in the following third formula.

The third formula is α=β−θ.

In this step, the controller determines, based on the linear position of the first WLAN device and the linear position of the second WLAN device, the direction of the straight line that passes through the linear position of the first WLAN device and the linear position of the second WLAN device, where the direction is the included angle β between the straight line and the standard direction; and determines the included angle α between the direction of the antenna array of the first WLAN device and the standard direction based on the direction β of the straight line and the included angle θ between the straight line and the direction of the antenna array of the first WLAN device, so as to obtain the direction of the antenna array of the first WLAN device.

Steps 204 and 205 may be repeatedly performed, to obtain a direction of an antenna array of each WLAN device in the device set.

In this embodiment of this application, the wireless channel characteristic data between the first WLAN device and the second WLAN device that is measured on all the WLAN channels in the channel set is obtained, where the channel set includes a plurality of channels, the first WLAN device is any WLAN device in the device set, the second WLAN device is another WLAN device that is in the device set and that can communicate with the first WLAN device, and the device set includes the plurality of WLAN devices; and the wireless channel characteristic data corresponding to all the WLAN channels is combined into the exceeded-bandwidth wireless channel characteristic data, and the position relationship between the first WLAN device and the second WLAN device is determined based on the exceeded-bandwidth wireless channel characteristic data. In this way, the position relationship between the first WLAN device and the second WLAN device can be automatically determined, thereby improving determining efficiency. In addition, because a higher bandwidth leads to a higher time resolution of a time parameter that is of a signal and that is determined based on corresponding wireless channel characteristic data, and a position relationship is determined based on the time parameter of the signal, a higher bandwidth leads to a more accurate position relationship. Therefore, precision of the position relationship determined based on the exceeded-bandwidth wireless channel characteristic data is relatively high such that accuracy of determining the position relationship can be improved.

Figure 6:
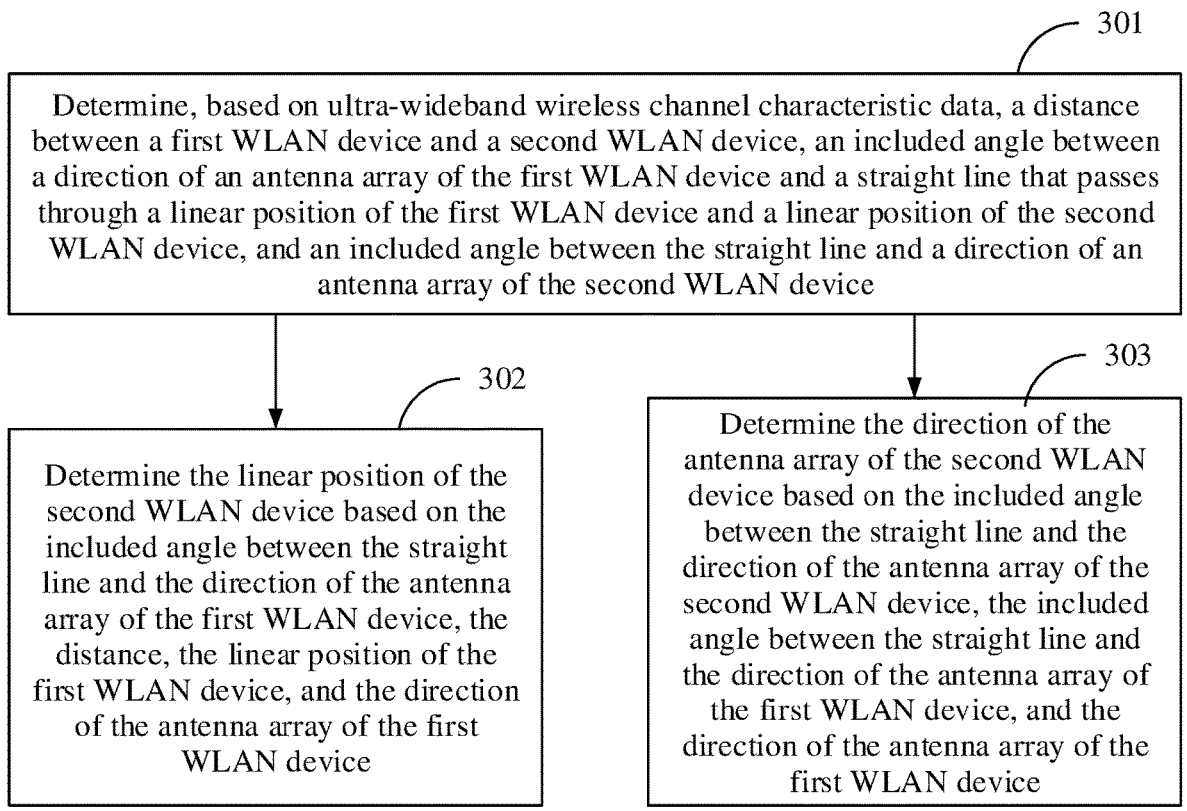
FIG. 6 is a flowchart of another position relationship determining method according to an embodiment of this application.

Referring to FIG. 6, an embodiment of this application provides a position relationship determining method. The method may be applied to the network architecture shown in FIG. 1. The method may be performed by the controller in the network architecture. The method includes the following steps.

Step 301: Determine, based on exceeded-bandwidth wireless channel characteristic data, a distance between a first WLAN device and a second WLAN device, an included angle between a direction of an antenna array of the first WLAN device and a straight line that passes through a linear position of the first WLAN device and a linear position of the second WLAN device, and an included angle between the straight line and a direction of an antenna array of the second WLAN device.

Optionally, the exceeded-bandwidth wireless channel characteristic data is a result obtained after combining wireless channel characteristic data corresponding to all WLAN channels in a channel set, the channel set includes at least two WLAN channels, all the WLAN channels in the channel set belong to a single WLAN frequency band, a total bandwidth occupied by all the WLAN channels in the channel set is greater than 160 megahertz and is greater than a maximum single channel bandwidth supported by the single WLAN frequency band, and wireless channel characteristic data corresponding to each WLAN channel in the channel set is a measurement result for a signal on corresponding WLAN channel between the first WLAN device and the second WLAN device.

Optionally, for a manner of obtaining the wireless channel characteristic data corresponding to each WLAN channel in the channel set, refer to related content in step 201 in the embodiment shown in FIG. 2. Details are not described herein again.

Optionally, for an implementation of combining the wireless channel characteristic data corresponding to all the WLAN channels in the channel set to obtain the exceeded-bandwidth wireless channel characteristic data, refer to related content of obtaining the exceeded-bandwidth wireless channel characteristic data in step 202 in the embodiment shown in FIG. 2. Details are not described herein again.

Optionally, for determining the distance between the first WLAN device and the second WLAN device based on the exceeded-bandwidth wireless channel characteristic data, refer to related content of obtaining the distance in step 202 in the embodiment shown in FIG. 2. Details are not described herein again.

Optionally, for determining, based on the exceeded-bandwidth wireless channel characteristic data, the included angle between the direction of the antenna array of the first WLAN device and the straight line that passes through the linear position of the first WLAN device and the linear position of the second WLAN device, and the included angle between the straight line and the direction of the antenna array of the second WLAN device, refer to related content of obtaining the included angle in step 204 in the embodiment shown in FIG. 2. Details are not described herein again.

Step 302: Determine the linear position of the second WLAN device based on the included angle between the straight line and the direction of the antenna array of the first WLAN device, the distance, the linear position of the first WLAN device, and the direction of the antenna array of the first WLAN device, where the linear position of the first WLAN device and the direction of the antenna array of the first WLAN device are known values.

A direction of the straight line may be determined based on the included angle between the straight line and the direction of the antenna array of the first WLAN device, and the direction of the antenna array of the first WLAN device, and the linear position of the second WLAN device may be determined based on the direction of the straight line, the distance, and the linear position of the first WLAN device.

Step 303: Determine the direction of the antenna array of the second WLAN device based on the included angle between the straight line and the direction of the antenna array of the second WLAN device, the included angle between the straight line and the direction of the antenna array of the first WLAN device, and the direction of the antenna array of the first WLAN device.

The direction of the straight line may be determined based on the included angle between the straight line and the direction of the antenna array of the first WLAN device, and the direction of the antenna array of the first WLAN device, and the direction of the antenna array of the second WLAN device may be determined based on the direction of the straight line and the included angle between the straight line and the direction of the antenna array of the second WLAN device.

Step 302 and step 303 may be performed simultaneously, or step 302 may be performed before step 303, or step 303 may be performed before step 302.

In this embodiment of this application, the distance between the first WLAN device and the second WLAN device, the included angle between the direction of the antenna array of the first WLAN device and the straight line that passes through the linear position of the first WLAN device and the linear position of the second WLAN device, and the included angle between the straight line and the direction of the antenna array of the second WLAN device can be automatically determined, thereby improving position relationship determining efficiency. In addition, a higher bandwidth leads to a higher time resolution, the exceeded-bandwidth wireless channel characteristic data is the result obtained after combining the wireless channel characteristic data corresponding to all the WLAN channels in the channel set, all the WLAN channels in the channel set belong to the single WLAN frequency band, and the total bandwidth occupied by all the WLAN channels in the channel set is greater than 160 megahertz and is greater than the maximum single channel bandwidth supported by the single WLAN frequency band. In this way, accuracy of the distance and the direction of the antenna array of the second WLAN device that are determined based on the exceeded-bandwidth wireless channel characteristic data is relatively high such that accuracy of determining the distance and the direction of the antenna array can be improved.

Figure 7:
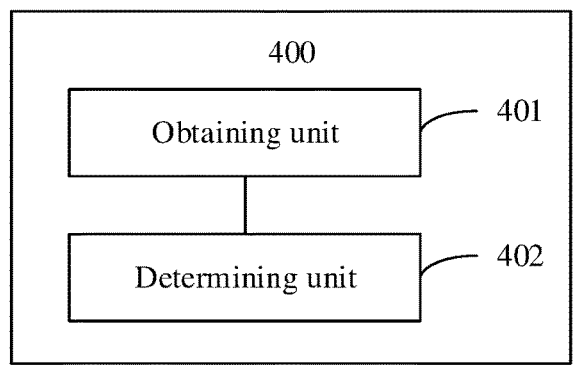
FIG. 7 is a schematic structural diagram of a position relationship determining apparatus according to an embodiment of this application.

Referring to FIG. 7, an embodiment of this application provides a position relationship determining apparatus 400. The apparatus 400 may be deployed in the controller in any one of the foregoing embodiments, and includes an obtaining unit 401 configured to obtain exceeded-bandwidth wireless channel characteristic data, where the exceeded-bandwidth wireless channel characteristic data is a result obtained after combining wireless channel characteristic data corresponding to all wireless local area network WLAN channels in a channel set, the channel set includes at least two WLAN channels, all the WLAN channels in the channel set belong to a single WLAN frequency band, a total bandwidth occupied by all the WLAN channels in the channel set is greater than 160 megahertz and is greater than a maximum single channel bandwidth supported by the single WLAN frequency band, and wireless channel characteristic data corresponding to each WLAN channel in the channel set is a measurement result for a signal on corresponding WLAN channel between a first WLAN device and a second WLAN device; and a determining unit 402 configured to determine a position relationship between the first WLAN device and the second WLAN device based on the exceeded-bandwidth wireless channel characteristic data.

Optionally, wireless channel characteristic data corresponding to any WLAN channel in the channel set includes first-direction channel state information CSI and second-direction CSI that correspond to the WLAN channel; and the first-direction CSI is obtained through measurement when the second WLAN device receives a first signal on the WLAN channel, the first signal is a signal sent by the first WLAN device on the WLAN channel, the second-direction CSI is obtained through measurement when the first WLAN device receives a second signal on the WLAN channel, and the second signal is a signal sent by the second WLAN device on the WLAN channel.

Optionally, wireless channel characteristic data corresponding to a specified WLAN channel in the channel set further includes a first-direction sending time, a first-direction receiving time, a second-direction sending time, and a second-direction receiving time; and the first-direction sending time is a time at which the first WLAN device sends a third signal on the specified WLAN channel, the first-direction receiving time is a time at which the second WLAN device receives the third signal on the specified WLAN channel, the second-direction sending time is a time at which the second WLAN device sends a fourth signal on the specified WLAN channel, and the second-direction receiving time is a time at which the first WLAN device receives the fourth signal on the specified WLAN channel.

Optionally, the position relationship is a distance between the first WLAN device and the second WLAN device.

The determining unit 402 is configured to perform inverse Fourier transform on first-direction exceeded-bandwidth CSI, to obtain a first energy delay function, where the first energy delay function includes a plurality of energy values and a delay offset corresponding to each energy value, and the first-direction exceeded-bandwidth CSI is a result obtained after combining first-direction CSI corresponding to all the WLAN channels in the channel set; perform inverse Fourier transform on second-direction exceeded-bandwidth CSI, to obtain a second energy delay function, where the second energy delay function includes a plurality of energy values and a delay offset corresponding to each energy value, and the second-direction exceeded-bandwidth CSI is a result obtained after combining second-direction CSI corresponding to all the WLAN channels in the channel set; adjust, based on an earliest delay offset in a first direction, the first-direction receiving time corresponding to the specified WLAN channel, where the earliest delay offset in the first direction is an earliest delay offset in a delay offset corresponding to an energy value that exceeds an energy threshold and that is included in the first energy delay function; adjust, based on an earliest delay offset in a second direction, the second-direction receiving time corresponding to the specified WLAN channel, where the earliest delay offset in the second direction is an earliest delay offset in a delay offset corresponding to an energy value that exceeds an energy threshold and that is included in the second energy delay function; and determine the distance between the first WLAN device and the second WLAN device based on an adjusted first-direction receiving time, an adjusted second-direction receiving time, and the first-direction sending time and the second-direction sending time that correspond to the specified WLAN channel.

Optionally, the position relationship is an included angle between a direction of an antenna array of the first WLAN device and a straight line that passes through a linear position of the first WLAN device and a linear position of the second WLAN device; and wireless channel characteristic data corresponding to a WLAN channel in the channel set includes wireless channel characteristic data of at least two antennas included in the antenna array of the first WLAN device.

The determining unit 402 is configured to determine, based on exceeded-bandwidth wireless channel characteristic data of each of the at least two antennas and a distance between any two of the at least two antennas, the included angle between the direction of the antenna array of the first WLAN device and the straight line that passes through the linear position of the first WLAN device and the linear position of the second WLAN device.

Optionally, a direction of the straight line is a known value, and the determining unit 402 is further configured to determine the direction of the antenna array of the first WLAN device based on the direction of the straight line and the included angle.

In this embodiment of this application, the obtaining unit obtains the wireless channel characteristic data between the first WLAN device and the second WLAN device that is measured on all the WLAN channels in the channel set, where the channel set includes a plurality of channels, the first WLAN device is any WLAN device in a device set, the second WLAN device is another WLAN device that is in the device set and that can communicate with the first WLAN device, and the device set includes a plurality of WLAN devices; and combines the wireless channel characteristic data corresponding to all the WLAN channels into the exceeded-bandwidth wireless channel characteristic data. The determining unit determines the position relationship between the first WLAN device and the second WLAN device based on the exceeded-bandwidth wireless channel characteristic data. In this way, the position relationship between the first WLAN device and the second WLAN device can be automatically determined, thereby improving determining efficiency. In addition, because a higher bandwidth leads to a higher time resolution, precision of the position relationship determined based on the exceeded-bandwidth wireless channel characteristic data is relatively high such that accuracy of determining the position relationship can be improved.

Figure 8:
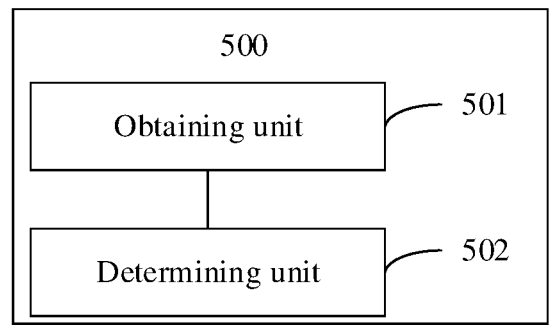
FIG. 8 is a schematic structural diagram of another position relationship determining apparatus according to an embodiment of this application.

Referring to FIG. 8, an embodiment of this application provides a position relationship determining apparatus 500. The apparatus 500 may be deployed in the controller in any one of the foregoing embodiments, and includes an obtaining unit 501 configured to obtain, based on exceeded-bandwidth wireless channel characteristic data, a distance between a first wireless local area network WLAN device and a second WLAN device, an included angle between a direction of an antenna array of the first WLAN device and a straight line that passes through a linear position of the first WLAN device and a linear position of the second WLAN device, and an included angle between the straight line and a direction of an antenna array of the second WLAN device, where the exceeded-bandwidth wireless channel characteristic data is a result obtained after combining wireless channel characteristic data corresponding to all WLAN channels in a channel set, the channel set includes at least two WLAN channels, all the WLAN channels in the channel set belong to a single WLAN frequency band, a total bandwidth occupied by all the WLAN channels in the channel set is greater than 160 megahertz and is greater than a maximum single channel bandwidth supported by the single WLAN frequency band, and wireless channel characteristic data corresponding to each WLAN channel in the channel set is a measurement result for a signal on corresponding WLAN channel between the first WLAN device and the second WLAN device; and a determining unit 502 configured to determine the linear position of the second WLAN device based on the included angle between the straight line and the direction of the antenna array of the first WLAN device, the distance, the linear position of the first WLAN device, and the direction of the antenna array of the first WLAN device, where the linear position of the first WLAN device and the direction of the antenna array of the first WLAN device are known values; and determine the direction of the antenna array of the second WLAN device based on the included angle between the straight line and the direction of the antenna array of the second WLAN device, the included angle between the straight line and the direction of the antenna array of the first WLAN device, and the direction of the antenna array of the first WLAN device.

In this embodiment of this application, the distance between the first WLAN device and the second WLAN device, the included angle between the direction of the antenna array of the first WLAN device and the straight line that passes through the linear position of the first WLAN device and the linear position of the second WLAN device, and the included angle between the straight line and the direction of the antenna array of the second WLAN device can be automatically determined, thereby improving position relationship determining efficiency. In addition, a higher bandwidth leads to a higher time resolution, the exceeded-bandwidth wireless channel characteristic data is the result obtained after combining the wireless channel characteristic data corresponding to all the WLAN channels in the channel set, all the WLAN channels in the channel set belong to the single WLAN frequency band, and the total bandwidth occupied by all the WLAN channels in the channel set is greater than 160 megahertz and is greater than the maximum single channel bandwidth supported by the single WLAN frequency band. In this way, accuracy of the distance and the direction of the antenna array of the second WLAN device that are determined based on the exceeded-bandwidth wireless channel characteristic data is relatively high such that accuracy of determining the distance and the direction of the antenna array can be improved.

Figure 9:
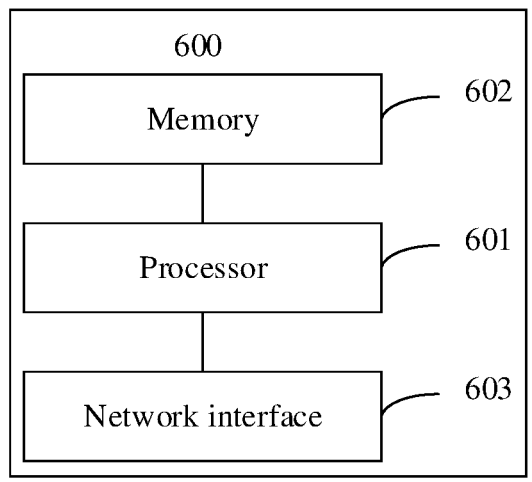
FIG. 9 is a schematic structural diagram of another position relationship determining apparatus according to an embodiment of this application.
Figure 10:
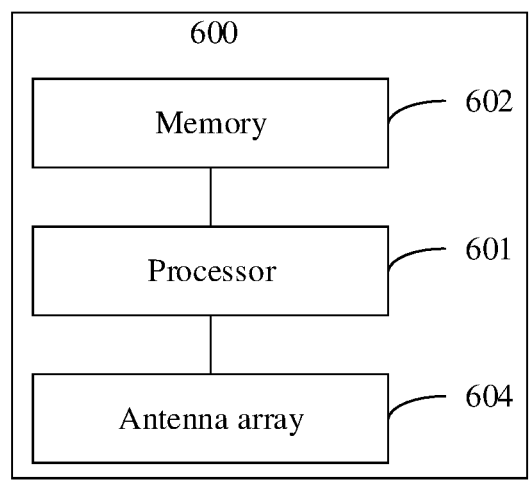
FIG. 10 is a schematic structural diagram of another position relationship determining apparatus according to an embodiment of this application.

FIG. 9 and FIG. 10 are schematic diagrams of a position relationship determining apparatus 600 according to an embodiment of this application. The apparatus 600 includes a processor 601 and a memory 602. The processor 601 is connected to the memory 602.

The apparatus 600 is a hardware structure apparatus, and may be configured to implement a function module in the apparatus shown in FIG. 7 or FIG. 8. For example, a person skilled in the art may figure out that the obtaining unit 401 and the determining unit 402 in the apparatus 400 shown in FIG. 7 or the obtaining unit 501 and the determining unit 502 in the apparatus 500 shown in FIG. 8 may be implemented by invoking code in the memory 602 by the processor 601.

Optionally, the processor 601 may be one or more central processing units (CPU).

Optionally, referring to FIG. 9, when the apparatus 600 is a server, the apparatus 600 may further include a network interface 603. The processor 601 may be connected to the network interface 603. The processor 601 may communicate with a WLAN device in a device set by using the network interface 603. The device set includes a plurality of WLAN devices, and the WLAN device may be an AP.

Optionally, referring to FIG. 10, when the apparatus 600 is a WLAN device, for example, when the apparatus 600 is an AP, the apparatus 600 may further include an antenna array 604. The processor 601 may be connected to the antenna array 604. The processor 601 may communicate with another WLAN device in a device set by using the antenna array 604.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this application, and are not intended to limit this application. Any modification made in this application shall fall within the protection scope of this application.

What is claimed is:

1. A position relationship determining method, comprising:

combining wireless channel characteristic data of all wireless local area network (WLAN) channels in a channel set to obtain exceeded-bandwidth wireless channel characteristic data, wherein the channel set comprises at least two WLAN channels, wherein all the WLAN channels in the channel set belong to a single WLAN frequency band, wherein a total bandwidth occupied by the WLAN channels is greater than 160 megahertz (MHz) and is greater than a maximum single channel bandwidth supported by the single WLAN frequency band, and wherein wireless channel characteristic data corresponding to each WLAN channel in the channel set is a measurement result of a signal for a corresponding WLAN channel between a first WLAN device and a second WLAN device; and determining a position relationship between the first WLAN device and the second WLAN device based on the exceeded-bandwidth wireless channel characteristic data.

2. The position relationship determining method of claim 1, wherein wireless channel characteristic data corresponding to any WLAN channel in the channel set comprise first-direction channel state information (CSI) and second-direction CSI, wherein the first-direction CSI corresponds to a first WLAN channel in the channel set, wherein the second-direction CSI corresponds to the first WLAN channel, and wherein the position relationship determining method further comprises:

obtaining the first-direction CSI from the second WLAN device, wherein the first-direction CSI is based on a measurement result for a first signal that is sent from the first WLAN device on the first WLAN channel; and obtaining the second-direction CSI from the first WLAN device, wherein the second-direction CSI is based on a measurement result for a second signal that is sent from the second WLAN device on the first WLAN channel.

3. The position relationship determining method of claim 2, wherein third wireless channel characteristic data that corresponds to a specified WLAN channel in the channel set further comprise a first-direction sending time, a first-direction receiving time, a second-direction sending time, and a second-direction receiving time, wherein the first-direction sending time is a time that a third signal is sent from the first WLAN device on the specified WLAN channel, wherein the first-direction receiving time is a time that the third signal is received on the specified WLAN channel, wherein the second-direction sending time is a time that a fourth signal is sent on the specified WLAN channel, and wherein the second-direction receiving time is a time that the fourth signal is received on the specified WLAN channel.

4. The position relationship determining method of claim 3, wherein the position relationship is a distance between the first WLAN device and the second WLAN device, wherein determining the position relationship between the first WLAN device and the second WLAN device based on the exceeded-bandwidth wireless channel characteristic data comprises:

obtaining first-direction exceeded-bandwidth CSI combining all first-direction CSI corresponding to the WLAN channels in the channel set;

performing an inverse Fourier transform on the first-direction exceeded-bandwidth CSI after obtaining the first-direction exceeded-bandwidth CSI to obtain a first energy delay function, wherein the first energy delay function comprises a plurality of first energy values and a first delay offset that corresponds to each of the first energy values;

obtaining second-direction exceeded-bandwidth CSI combining all second-direction CSI corresponding to all the WLAN channels in the channel set;

performing an inverse Fourier transform on the second-direction exceeded-bandwidth CSI after obtaining the second-direction exceeded-bandwidth CSI to obtain a second energy delay function, wherein the second energy delay function comprises a plurality of second energy values and a second delay offset that corresponds to each of the second energy values;

adjusting, based on an earliest delay offset in a first direction, the first-direction receiving time that corresponds to the specified WLAN channel, wherein the earliest delay offset in the first direction corresponds to an energy value that exceeds a first energy threshold that is part of the first energy delay function;

adjusting, based on an earliest delay offset in a second direction, the second-direction receiving time that corresponds to the specified WLAN channel, wherein the earliest delay offset in the second direction corresponds to an energy value that exceeds a second energy threshold that is part of the second energy delay function; and determining the distance between the first WLAN device and the second WLAN device based on an adjusted first-direction receiving time, an adjusted second-direction receiving time, the first-direction sending time that corresponds to the specified WLAN channel, and the second-direction sending time that corresponds to the specified WLAN channel.

5. The position relationship determining method of claim 1, wherein the position relationship is an included angle between a direction of an antenna array of the first WLAN device and a straight line that passes through a linear position of the first WLAN device and a linear position of the second WLAN device, wherein a second wireless channel characteristic data that corresponds to a second WLAN channel in the channel set comprises second wireless channel characteristic data of at least two antennas that is part of the antenna array of the first WLAN device, and wherein determining the position relationship between the first WLAN device and the second WLAN device based on the exceeded-bandwidth wireless channel characteristic data comprises determining, based on second exceeded-bandwidth wireless channel characteristic data of each of the antennas and a distance between any two of the antennas, the included angle between the direction of the antenna array of the first WLAN device and the straight line that passes through the linear position of the first WLAN device and the linear position of the second WLAN device.

6. The position relationship determining method of claim 5, wherein a direction of the straight line is a known value, and wherein after determining the included angle between the direction of the antenna array of the first WLAN device and the straight line that passes through the linear position of the first WLAN device and the linear position of the second WLAN device, the method further comprises determining the direction of the antenna array of the first WLAN device based on the direction of the straight line and the included angle.

7. A position relationship determining method, comprising:

combining wireless channel characteristic data of all wireless local area network (WLAN) channels in a channel set to obtain an exceeded-bandwidth wireless channel characteristic data, wherein the channel set comprises at least two WLAN channels, wherein all the WLAN channels in the channel set belong to a single WLAN frequency band, wherein a total bandwidth occupied by the WLAN channels is greater than 160 megahertz and is greater than a maximum single channel bandwidth supported by the single WLAN frequency band, and wherein wireless channel characteristic data corresponding to each WLAN channel in the channel set is a measurement result for a signal for a corresponding WLAN channel between a first WLAN device and a second WLAN device;

determining, based on the exceeded-bandwidth wireless channel characteristic data, a distance between the first WLAN device and the second WLAN device, an included angle between a direction of an antenna array of the first WLAN device and a straight line that passes through a linear position of the first WLAN device and a linear position of the second WLAN device, and an included angle between the straight line and a direction of an antenna array of the second WLAN device;

determining the linear position of the second WLAN device based on the included angle between the straight line and the direction of the antenna array of the first WLAN device, the distance, the linear position of the first WLAN device, and the direction of the antenna array of the first WLAN device, wherein the linear position of the first WLAN device and the direction of the antenna array of the first WLAN device are known values; and determining the direction of the antenna array of the second WLAN device based on the included angle between the straight line and the direction of the antenna array of the second WLAN device, the included angle between the straight line and the direction of the antenna array of the first WLAN device, and the direction of the antenna array of the first WLAN device.

8. A position relationship determining apparatus, comprising:

a memory storing a program comprising instructions; and
a processor coupled to the memory and configured to execute the instructions, wherein the instructions cause the processor to be configured to:

combine wireless channel characteristic data of all wireless local area network (WLAN) channels in a channel set to obtain exceeded-bandwidth wireless channel characteristic data, wherein the channel set comprises at least two WLAN channels, wherein all WLAN channels in the channel set belong to a single WLAN frequency band, wherein a total bandwidth occupied by the WLAN channels is greater than 160 megahertz (MHz) and is greater than a maximum single channel bandwidth supported by the single WLAN frequency band, and wherein wireless channel characteristic data corresponding to each WLAN channel in the channel set is a measurement result of a signal for a corresponding WLAN channel between a first WLAN device and a second WLAN device; and determine a position relationship between the first WLAN device and the second WLAN device based on the exceeded-bandwidth wireless channel characteristic data.

9. The position relationship determining apparatus of claim 8, wherein wireless channel characteristic data corresponding to any WLAN channel in the channel set comprise first-direction channel state information (CSI) and second-direction CSI, wherein the first-direction CSI corresponds to a first WLAN channel in the channel set, wherein the second-direction CSI corresponds to the first WLAN channel, and wherein the instructions further cause the processor to be configured to:

obtain the first-direction CSI from the second WLAN device, wherein the first-direction CSI is based on a measurement result for a first signal that is sent from the first WLAN device on the first WLAN channel;

obtain the second-direction CSI from the first WLAN device, wherein the second-direction CSI is based on a measurement result for a second signal that is sent from the second WLAN device on the first WLAN channel.

10. The position relationship determining apparatus of claim 9, wherein third wireless channel characteristic data that corresponds to a specified WLAN channel in the channel set further comprise a first-direction sending time, a first-direction receiving time, a second-direction sending time, and a second-direction receiving time, wherein the first-direction sending time is a time that a third signal is sent on the specified WLAN channel, wherein the first-direction receiving time is a time that the third signal is received on the specified WLAN channel, wherein the second-direction sending time is a time that a fourth signal is sent on the specified WLAN channel, and wherein the second-direction receiving time is a time that the fourth signal is received on the specified WLAN channel.

11. The position relationship determining apparatus of claim 10, wherein the position relationship is a distance between the first WLAN device and the second WLAN device, wherein the instructions to cause the processor to determine the position relationship between the first WLAN device and the second WLAN device based on the exceeded-bandwidth wireless channel characteristic data further comprises instructions to cause the processor to:
obtain first-direction exceeded-bandwidth CSI combining all first-direction CSI corresponding to the WLAN channels in the channel set; and
perform inverse Fourier transform on the first-direction exceeded-bandwidth CSI after obtaining the first-direction exceeded-bandwidth CSI to obtain a first energy delay function, wherein the first energy delay function comprises a plurality of first energy values and a first delay offset that corresponds to each of the first energy values.

12. The position relationship determining apparatus of claim 11, wherein the instructions to cause the processor to determine the position relationship between the first WLAN device and the second WLAN device based on the exceeded-bandwidth wireless channel characteristic data further comprises instructions to cause the processor to be configured to:
obtain second-direction exceeded-bandwidth CSI combining all second-direction CSI corresponding to all the WLAN channels in the channel set;
perform an inverse Fourier transform on the second-direction exceeded-bandwidth CSI after obtaining the second-direction exceeded-bandwidth CSI to obtain a second energy delay function, wherein the second energy delay function comprises a plurality of second energy values and a second delay offset that corresponds to each of the second energy values;
adjust, based on an earliest delay offset in a first direction, the first-direction receiving time that corresponds to the specified WLAN channel, wherein the earliest delay offset in the first direction corresponds to an energy value that exceeds a first energy threshold that is part of the first energy delay function; and
adjust, based on an earliest delay offset in a second direction, the second-direction receiving time that corresponds to the specified WLAN channel, wherein the earliest delay offset in the second direction corresponds to an energy value that exceeds a second energy threshold that is part of the second energy delay function.

13. The position relationship determining apparatus of claim 12, wherein the instructions further cause the processor to be configured to determine the distance between the first WLAN device and the second WLAN device based on an adjusted first-direction receiving time, an adjusted second-direction receiving time, the first-direction sending time that corresponds to the specified WLAN channel, and the second-direction sending time that corresponds to the specified WLAN channel.

14. The position relationship determining apparatus of claim 8, wherein the position relationship is an included angle between a direction of an antenna array of the first WLAN device and a straight line that passes through a linear position of the first WLAN device and a linear position of the second WLAN device, wherein a second wireless channel characteristic data that corresponds to a second WLAN channel in the channel set comprises second wireless channel characteristic data of at least two antennas, wherein the antennas are part of the antenna array of the first WLAN device, and wherein the instructions to determine the position relationship between the first WLAN device and the second WLAN device based on the exceeded-bandwidth wireless channel characteristic data further comprises instructions to cause the processor to be configured to determine, based on second exceeded-bandwidth wireless channel characteristic data of each of the antennas and a distance between any two of the antennas, the included angle between the direction of the antenna array of the first WLAN device and the straight line that passes through the linear position of the first WLAN device and the linear position of the second WLAN device.

15. The position relationship determining apparatus of claim 14, wherein a direction of the straight line is a known value, and wherein the instructions further cause the processor to be configured to determine the direction of the antenna array of the first WLAN device based on the direction of the straight line and the included angle after determining the included angle between the direction of the antenna array of the first WLAN device and the straight line that passes through the linear position of the first WLAN device and the linear position of the second WLAN device.

16. A position relationship determining apparatus, comprising:
a memory storing a program comprising instructions; and
a processor coupled to the memory and configured to execute the instructions, wherein the instructions cause the processor to:
combine wireless channel characteristic data of all wireless local area network (WLAN) channels in a channel set to obtain an exceeded-bandwidth wireless channel characteristic data, wherein the channel set comprises at least two WLAN channels, wherein all the WLAN channels in the channel set belong to a single WLAN frequency band, wherein a total bandwidth occupied by the WLAN channels is greater than 160 megahertz (MHz) and is greater than a maximum single channel bandwidth supported by the single WLAN frequency band, and wherein wireless channel characteristic data corresponding to each WLAN channel in the channel set is a measurement result for a signal for a corresponding WLAN channel between a first WLAN device and a second WLAN device; and
determine, based on the exceeded-bandwidth wireless channel characteristic data, a distance between the first WLAN device and the second WLAN device, an included angle between a direction of an antenna array of the first WLAN device and a straight line that passes through a linear position of the first WLAN device and a linear position of the second WLAN device, and an included angle between the straight line and a direction of an antenna array of the second WLAN device.

17. The position relationship determining apparatus of claim 15, wherein the wireless channel characteristic data corresponding to any WLAN channel in the channel set comprise first-direction channel state information (CSI) and second-direction CSI, wherein the first-direction CSI corresponds to a first WLAN channel in the channel set, and wherein the second-direction CSI corresponds to the first WLAN channel.

18. The position relationship determining apparatus of claim 15, wherein the instructions further cause the processor to be configured to determine the linear position of the second WLAN device based on the included angle between the straight line and the direction of the antenna array of the first WLAN device, the distance, the linear position of the first WLAN device, and the direction of the antenna array of the first WLAN device, wherein the linear position of the first WLAN device and the direction of the antenna array of the first WLAN device are known values.

19. The position relationship determining apparatus of claim 18, wherein the instructions further cause the processor to be configured to determine the direction of the antenna array of the second WLAN device based on the included angle between the straight line and the direction of the antenna array of the second WLAN device, the included angle between the straight line and the direction of the antenna array of the first WLAN device, and the direction of the antenna array of the first WLAN device.

20. The position relationship determining apparatus of claim 18, wherein a direction of the straight line is a known value, and wherein the instructions further cause the processor to be configured to determine the direction of the antenna array of the first WLAN device based on the direction of the straight line and the included angle after determining the included angle between the direction of the antenna array of the first WLAN device and the straight line that passes through the linear position of the first WLAN device and the linear position of the second WLAN device.

* * * * *

UNITED STATES PATENT AND TRADEMARK OFFICE
CERTIFICATE OF CORRECTION

PATENT NO. : 11,166,254 B2  
APPLICATION NO. : 16/698026  
DATED : November 2, 2021  
INVENTOR(S) : Chun Pan et al.

It is certified that error appears in the above-identified patent and that said Letters Patent is hereby corrected as shown below:

In the Claims

Claim 17, Column 36, Line 66: "claim 15" should read "claim 16"

Claim 18, Column 37, Line 7: "claim 15" should read "claim 16"

Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*